United States Patent
Inoue et al.

(10) Patent No.: US 10,463,920 B2
(45) Date of Patent: Nov. 5, 2019

(54) GOLF BALL

(71) Applicant: Sumitomo Rubber Industries, Ltd., Kobe-shi, Hyogo (JP)

(72) Inventors: Hidetaka Inoue, Kobe (JP); Kazuya Kamino, Kobe (JP); Toshiyuki Tarao, Kobe (JP); Mami Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 16/234,274

(22) Filed: Dec. 27, 2018

(65) Prior Publication Data

US 2019/0201748 A1 Jul. 4, 2019

(30) Foreign Application Priority Data

Dec. 28, 2017 (JP) ................. 2017-252822

(51) Int. Cl.
*A63B 37/00* (2006.01)
*A63B 102/32* (2015.01)
*C08L 75/04* (2006.01)

(52) U.S. Cl.
CPC ...... *A63B 37/0096* (2013.01); *A63B 37/0022* (2013.01); *A63B 37/0092* (2013.01);
(Continued)

(58) Field of Classification Search
CPC .......... C08L 75/04; C08L 75/06; C08L 75/08; C08L 75/10; C08L 75/12; C08L 75/14;
(Continued)

(56) References Cited

U.S. PATENT DOCUMENTS

| | | | |
|---|---|---|---|
| 6,454,667 B1 * | 9/2002 | Iwami | A63B 37/0003 473/351 |
| 2009/0105012 A1 * | 4/2009 | Kamino | A63B 37/0003 473/377 |

(Continued)

FOREIGN PATENT DOCUMENTS

| | | |
|---|---|---|
| JP | 2011-92328 A | 5/2011 |
| JP | 2015-126772 A | 7/2015 |
| JP | 2017-42280 A | 3/2017 |

*Primary Examiner* — John E Simms, Jr.
(74) *Attorney, Agent, or Firm* — Birch Stewart Kolasch & Birch LLP

(57) ABSTRACT

An object of the present invention is to provide a golf ball that can strike a good balance in approach performance under a rough condition and a wet condition while maintaining a flight distance on driver shots. The present invention provides a golf ball comprising a golf ball body and a paint film formed on a surface of the golf ball body, wherein the golf ball body has a spherical core, an intermediate layer covering the spherical core, and a cover covering the intermediate layer, and the paint film has a multi-layered construction composed of two or more layers, wherein a 10% elastic modulus (Pi10) of an innermost layer of the paint film is greater than a 10% elastic modulus (Po10) of an outermost layer of the paint film and a 10% elastic modulus (C10) of a material constituting the cover, and a thickness (Ti) of the innermost layer of the paint film is greater than a thickness (To) of the outermost layer of the paint film, a 10% elastic modulus (M10) of a material constituting the intermediate layer is greater than the 10% elastic modulus (C10) of the material constituting the cover, and a difference (Po10−C10) between the 10% elastic modulus (Po10) of the outermost layer of the paint film and the 10% elastic modulus (C10) of the material constituting the cover is −4.0 kgf/cm² or more and 50 kgf/cm² or less, and a Shore D hardness (Hc) of the material constituting the cover is 40 or less.

20 Claims, 2 Drawing Sheets

(52) U.S. Cl.
CPC ....... *A63B 37/0065* (2013.01); *A63B 37/0076* (2013.01); *A63B 2102/32* (2015.10); *C08L 75/04* (2013.01)

(58) Field of Classification Search
CPC .. C08L 75/16; A63B 37/0022; A63B 37/0096
See application file for complete search history.

(56) References Cited

U.S. PATENT DOCUMENTS

| | | | |
|---|---|---|---|
| 2011/0098133 A1 | 4/2011 | Shiga et al. | |
| 2015/0182804 A1* | 7/2015 | Tarao | A63B 37/0022 473/374 |
| 2015/0375054 A1* | 12/2015 | Tachibana | A63B 37/0075 473/374 |
| 2016/0136484 A1* | 5/2016 | Inoue | A63B 37/0022 473/377 |
| 2017/0056731 A1 | 3/2017 | Tarao et al. | |

\* cited by examiner

GOLF BALL

FIELD OF THE INVENTION

The present invention relates to a technology for improving approach spin performance of a golf ball.

DESCRIPTION OF THE RELATED ART

It is desirable for a golf ball to travel a great flight distance on driver shots and have excellent spin performance on approach shots. Thus, conventionally, a golf ball having improved flight performance on driver shots and improved spin performance on approach shots by controlling a cover material or paint film properties of the golf ball has been proposed.

As a technology for improving the approach performance (in particular the approach performance for 40 yards or more) of a golf ball by appropriately choosing the cover material, Japanese Patent Publication No. 2011-092328 A is exemplified. Japanese Patent Publication No. 2011-092328 A discloses a golf ball comprising a core and a cover, wherein the cover is formed from a golf ball resin composition containing a polyurethane, and the polyurethane includes a polyol component having a number average molecular weight ranging from 200 to 1500 as a constituent component.

As a technology for improving the properties of a golf ball by controlling the paint film properties, Japanese Patent Publication No. 2015-126772 A and No. 2017-042280 A are exemplified. Japanese Patent Publication No. 2015-126772 A discloses a golf ball comprising a golf ball body and a paint film formed on a surface of the golf ball body, wherein a base resin constituting the paint film is a polyurethane obtained by a reaction between a polyol composition and a polyisocyanate composition, the polyol composition contains a urethane polyol including a polyether diol having a number average molecule weight ranging from 800 to 3000 as a constituent component, the paint film has a 10% elastic modulus of 100 kgf/cm$^2$ or less, and the 10% elastic modulus (kgf/cm$^2$) (Y) of the paint film and a molar ratio (NCO/OH) (X) of NCO groups in the polyisocyanate composition to OH groups in the polyol composition satisfy a relationship of Y≤200×X−75.

Japanese Patent Publication No. 2017-042280 A discloses a golf ball comprising a golf ball body and a paint film formed on a surface of the golf ball body, wherein the paint film has a multi-layered construction composed of two or more layers, and a difference ($M_{in}$−$M_{out}$) between a 10% elastic modulus ($M_{in}$) of an innermost layer of the paint film and a 10% elastic modulus ($M_{out}$) of an outermost layer of the paint film is 25 kgf/cm$^2$ or more.

SUMMARY OF THE INVENTION

The golf ball having a high spin rate on approach shots has excellent controllability. The golf ball having a high spin rate easily stops near the pin. In recent years, it is desirable that not only the spin rate under a dry condition from the fairway, but also the spin rate from the rough and the spin rate under a wet condition are increased on approach shots. The golf balls disclosed in the above-mentioned prior arts have improved spin rate to a certain extent on approach shots under a dry condition or a wet condition, however, there is still room for improvement of the spin rate thereof on approach shots under a rough condition. On the other hand, if the spin rate on approach shots is increased, the spin rate on driver shots tends to be increased accordingly. Thus, there is a problem that the flight distance on driver shots is lowered. The present invention has been achieved in view of the above problems, and an object of the present invention is to provide a golf ball having increased spin rate on approach shots under a rough condition and a wet condition, while maintaining the flight distance on driver shots.

The present invention that has solved the above problems provides a golf ball comprising a golf ball body and a paint film formed on a surface of the golf ball body, wherein the golf ball body has a spherical core, an intermediate layer covering the spherical core, and a cover covering the intermediate layer, and the paint film has a multi-layered construction composed of two or more layers, wherein a 10% elastic modulus (Pi10) of an innermost layer of the paint film is greater than a 10% elastic modulus (Po10) of an outermost layer of the paint film and a 10% elastic modulus (C10) of a material constituting the cover, and a thickness (Ti) of the innermost layer of the paint film is greater than a thickness (To) of the outermost layer of the paint film, a 10% elastic modulus (M10) of a material constituting the intermediate layer is greater than the 10% elastic modulus (C10) of the material constituting the cover, and a difference (Po10-C10) between the 10% elastic modulus (Po10) of the outermost layer of the paint film and the 10% elastic modulus (C10) of the material constituting the cover is −4.0 kgf/cm$^2$ or more and 50 kgf/cm$^2$ or less, and a Shore D hardness (Hc) of the material constituting the cover is 40 or less.

Based on the above-mentioned construction, the present invention can provide a golf ball that has an increased spin rate on approach shots under a rough condition and an increased spin rate on approach shots under a wet condition while maintaining a flight distance on driver shots.

According to the present invention, a golf ball that strikes a good balance in approach performances under a rough condition and a wet condition while maintaining a flight distance on driver shots is provided.

DESCRIPTION OF THE PREFERRED EMBODIMENT

Figure 1:
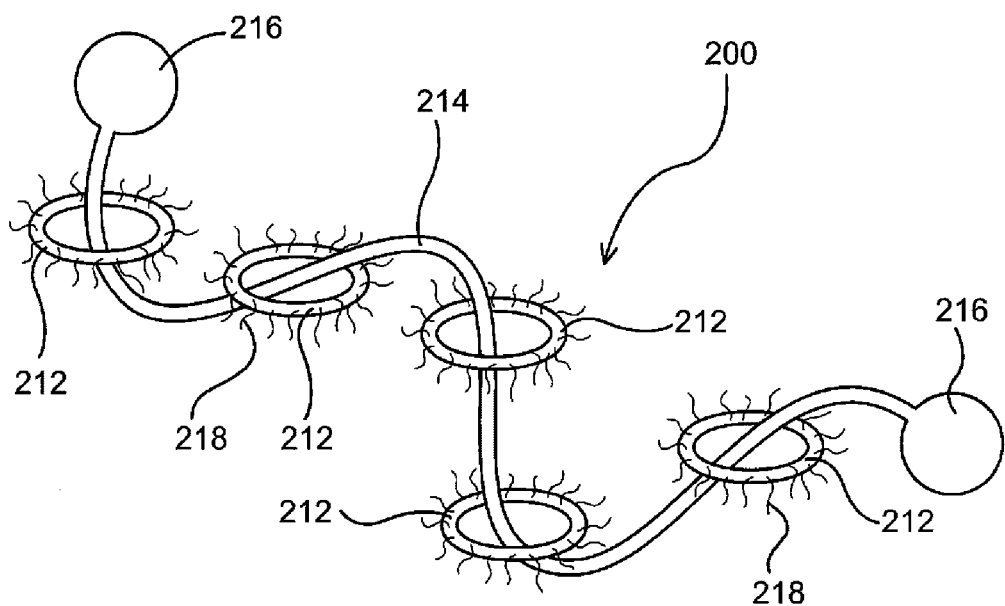
FIG. 1 is an explanatory drawing illustrating a molecular structure of one example of a polyrotaxane used in the present invention.

The present invention provides a golf ball comprising a golf ball body and a paint film formed on a surface of the golf ball body, wherein the golf ball body has a spherical core, an intermediate layer covering the spherical core, and a cover covering the intermediate layer, and the paint film has a multi-layered construction composed of two or more layers, wherein a 10% elastic modulus (Pi10) of an innermost layer of the paint film is greater than a 10% elastic modulus (Po10) of an outermost layer of the paint film and a 10% elastic modulus (C10) of a material constituting the cover, and a thickness (Ti) of the innermost layer of the paint film is greater than a thickness (To) of the outermost layer of the paint film, a 10% elastic modulus (M10) of a material constituting the intermediate layer is greater than the 10% elastic modulus (C10) of the material constituting the cover, and a difference (Po10−C10) between the 10% elastic modulus (Po10) of the outermost layer of the paint film and the 10% elastic modulus (C10) of the material constituting the cover is −4.0 kgf/cm² or more and 50 kgf/cm² or less, and a Shore D hardness (Hc) of the material constituting the cover is 40 or less.

If the 10% elastic modulus of the innermost layer of the paint film is larger than the 10% elastic modulus of the outermost layer of the paint film, the outermost layer of the paint film is softer and is easier to deform than the innermost layer of the paint film, and thus the outermost layer of the paint film steadily bites into the club face on approach shots under a rough condition and under a wet condition. As a result, the obtained golf ball has an increased spin rate on approach shots under a rough condition and an increased spin rate on approach shots under a wet condition. In addition, if the thickness of the innermost layer of the paint film is larger than the thickness of the outermost layer of the paint film, synergistically with the deformation effect due to the difference between the 10% elastic modulus of the innermost layer of the paint film and the 10% elastic modulus of the outermost layer of the paint film, the outermost layer of the paint film more easily deforms, and thus the outermost layer of the paint film more easily bites into the club face on approach shots, and the spin performance on approach shots under a rough condition and a wet condition is further enhanced.

If the 10% elastic modulus of the innermost layer of the paint film is larger than the 10% elastic modulus of the material constituting the cover, the relatively soft cover easily bites into the club face, and thus the spin performance on approach shots under a rough condition and a wet condition is further enhanced.

If the 10% elastic modulus of the material constituting the intermediate layer is larger than the 10% elastic modulus of the material constituting the cover, when the golf ball is hit, the deformation of the cover becomes more predominant than the deformation of the intermediate layer, the cover further bites into the club face and the friction of the cover with the club face is increased, and thus the spin performance on approach shots under a rough condition and the spin performance on approach shots under a wet condition are both enhanced.

If the difference between the 10% elastic modulus of the outermost layer of the paint film and the 10% elastic modulus of the material constituting the cover is −4.0 kgf/cm² or more and 50 kgf/cm² or less, the spin performance on approach shots under a rough condition and the spin performance on approach shots under a wet condition are enhanced in a good balance, and the durability of the golf ball at repeated hitting is enhanced as well.

If the Shore D hardness of the material constituting the cover is 40 or less, the spin performance on approach shots under a rough condition and the spin performance on approach shots under a wet condition are further enhanced, and the shot feeling becomes better as well.

1 Properties
1.1 Paint Film

The golf ball according to the present invention comprises a paint film formed on a surface of the golf ball body. The paint film is not particularly limited, as long as the paint film has a multi-layered construction composed of two or more layers. The paint film is not particularly limited, as long as the paint film has two or more layers, but the paint film preferably has four or less layers, more preferably three or less layers, and even more preferably two layers. If the paint film has four or less layers, the painting process does not become excessively complicated, and thus productivity is better.

The 10% elastic modulus (Pi10) of the innermost layer of the paint film is larger than the 10% elastic modulus (Po10) of the outermost layer of the paint film. In other words, the paint film satisfies a relationship of Pi10>Po10. If the relationship of Pi10>Po10 is satisfied, the outermost layer of the paint film is softer and is easier to deform than the innermost layer of the paint film, and thus the outermost layer of the paint film steadily bites into the club face on approach shots under a rough condition and under a wet condition. As a result, the obtained golf ball has an increased spin rate on approach shots under a rough condition and an increased spin rate on approach shots under a wet condition in a good balance.

The difference (Pi10−Po10) between the 10% elastic modulus (Pi10) of the innermost layer of the paint film and the 10% elastic modulus (Po10) of the outermost layer of the paint film is not particularly limited, but the difference (Pi10−Po10) is preferably 25 kgf/cm² (2.5 MPa) or more, more preferably 50 kgf/cm² (4.9 MPa) or more, even more preferably 75 kgf/cm² (7.4 MPa) or more, and most preferably 100 kgf/cm² (9.8 MPa) or more, and is preferably 400 kgf/cm² (39.2 MPa) or less, more preferably 350 kgf/cm² (34.3 MPa) or less, even more preferably 300 kgf/cm² (29.4 MPa) or less, and most preferably 200 kgf/cm² (19.6 MPa) or less. If the difference (Pi10−Po10) between the 10% elastic modulus (Pi10) of the innermost layer of the paint film and the 10% elastic modulus (Po10) of the outermost layer of the paint film is 25 kgf/cm² or more, the spin performance on approach shots under a rough condition and the spin performance on approach shots under a wet condition strike a better balance, and if the difference (Pi10-Po10) between the 10% elastic modulus (Pi10) of the innermost layer of the paint film and the 10% elastic modulus (Po10) of the outermost layer of the paint film is 400 kgf/cm² or less, delamination in the paint film hardly occurs, and thus the durability of the paint film is further enhanced.

The 10% elastic modulus (Pi10) of the innermost layer of the paint film is larger than the 10% elastic modulus (C10) of the material constituting the cover. In other words, the golf ball according to the present invention satisfies a relationship of Pi10>C10. If the relationship of Pi10>C10 is satisfied, since the cover of the golf ball is relatively soft and is easy to deform, the soft cover easily bites into the club face, the spin performance on approach shots under a rough condition and a wet condition is further enhanced.

The difference (Pi10-C10) between the 10% elastic modulus (Pi10) of the innermost layer of the paint film and the 10% elastic modulus (C10) of the material constituting the cover is not particularly limited, and but the difference (Pi10-C10) is preferably 25 kgf/cm² (2.5 MPa) or more, more preferably 50 kgf/cm² (4.9 MPa) or more, even more preferably 75 kgf/cm² (7.4 MPa) or more, and most preferably 100 kgf/cm² (9.8 MPa) or more, and is preferably 400 kgf/cm² (39.2 MPa) or less, more preferably 350 kgf/cm² (34.3 MPa) or less, even more preferably 300 kgf/cm² (29.4 MPa) or less, and most preferably 200 kgf/cm² (19.6 MPa) or less. If the difference (Pi10-C10) between the 10% elastic modulus (Pi10) of the innermost layer of the paint film and the 10% elastic modulus (C10) of the material constituting the cover is 25 kgf/cm² or more, the spin performance on approach shots under a rough condition and a wet condition is further enhanced, and if the difference (Pi10-C10) between the 10% elastic modulus (Pi10) of the innermost layer of the paint film and the 10% elastic modulus (C10) of the material constituting the cover is 400 kgf/cm² or less, the paint film easily follows the deformation of the cover when the golf ball is hit, and thus the durability at repeated hitting is better.

The difference (Po10−C10) between the 10% elastic modulus (Po10) of the outermost layer of the paint film and the 10% elastic modulus (C10) of the material constituting the cover is −4.0 kgf/cm$^2$ (−0.39 MPa) or more and 50 kgf/cm$^2$ (4.9 MPa) or less. The difference (Po10−C10) is preferably −3.5 kgf/cm$^2$ (−0.34 MPa) or more, more preferably −2.5 kgf/cm$^2$ (−0.25 MPa) or more, even more preferably −1.0 kgf/cm$^2$ (−0.10 MPa) or more, and most preferably 0 kgf/cm$^2$ (0 MPa) or more, and is preferably 45 kgf/cm$^2$ (4.4 MPa) or less, more preferably 40 kgf/cm$^2$ (3.9 MPa) or less, even more preferably 35 kgf/cm$^2$ (3.4 MPa) or less, and most preferably 30 kgf/cm$^2$ (2.9 MPa) or less. If the difference (Po10−C10) between the 10% elastic modulus (Po10) of the outermost layer of the paint film and the 10% elastic modulus (C10) of the material constituting the cover falls within the above range, the spin performance on approach shots under a rough condition and the spin performance on approach shots under a wet condition are enhanced in a good balance, and the durability of the golf ball at repeated hitting is enhanced as well.

The 10% elastic modulus (tensile stress at 10% strain) (Pi10) of the innermost layer of the paint film is preferably 100 kgf/cm$^2$ (9.8 MPa) or more, more preferably 125 kgf/cm$^2$ (12.3 MPa) or more, even more preferably 150 kgf/cm$^2$ (14.7 MPa) or more, and most preferably 175 kgf/cm$^2$ (17.2 MPa) or more, and is preferably 500 kgf/cm$^2$ (49.0 MPa) or less, more preferably 400 kgf/cm$^2$ (39.2 MPa) or less, even more preferably 300 kgf/cm$^2$ (29.4 MPa) or less, and most preferably 250 kgf/cm$^2$ (24.5 MPa) or less. If the 10% elastic modulus (Pi10) of the innermost layer of the paint film is 100 kgf/cm$^2$ or more, the spin performance on approach shots under a rough condition and the spin performance on approach shots under a wet condition are further enhanced in a good balance, and if the 10% elastic modulus (Pi10) of the innermost layer of the paint film is 500 kgf/cm$^2$ or less, the paint film has better durability. It is noted that if the 10% elastic modulus of the innermost layer of the paint film is high, the paint film is excessively hard, and crack tends to occur in the paint film.

The maximum elongation (strain at break) of the innermost layer of the paint film is preferably 30% or more, more preferably 40% or more, and even more preferably 50% or more, and is preferably 200% or less, more preferably 175% or less, and even more preferably 150% or less. If the maximum elongation of the innermost layer of the paint film is 30% or more, occurrence of crack in the paint film is suppressed and thus the paint film has further enhanced durability, and if the maximum elongation of the innermost layer of the paint film is 200% or less, the spin performance on approach shots under a rough condition and the spin performance on approach shots under a wet condition strike a better balance.

The 10% elastic modulus (tensile stress at 10% strain) (Po10) of the outermost layer of the paint film is preferably 5 kgf/cm$^2$ (0.5 MPa) or more, more preferably 6 kgf/cm$^2$ (0.6 MPa) or more, even more preferably 7 kgf/cm$^2$ (0.7 MPa) or more, and most preferably 10 kgf/cm$^2$ (1.0 MPa) or more, and is preferably less than 100 kgf/cm$^2$ (9.8 MPa), more preferably 90 kgf/cm$^2$ (8.8 MPa) or less, and even more preferably 80 kgf/cm$^2$ (7.8 MPa) or less. If the 10% elastic modulus (Po10) of the outermost layer of the paint film is 5 kgf/cm$^2$ or more, the stain resistance of the paint film is better, and if the 10% elastic modulus (Po10) of the outermost layer of the paint film is less than 100 kgf/cm$^2$, the spin performance on approach shots under a rough condition and the spin performance on approach shots under a wet condition strike a better balance.

The maximum elongation (strain at break) of the outermost layer of the paint film is preferably 100% or more, more preferably 120% or more, and even more preferably 140% or more, and is preferably 500% or less, more preferably 450% or less, and even more preferably 400% or less. If the maximum elongation of the outermost layer of the paint film is 100% or more, the spin performance on approach shots under a rough condition and the spin performance on approach shots under a wet condition strike a better balance, and the shot feeling is also enhanced, and if the maximum elongation of the outermost layer of the paint film is 500% or less, the paint film is not excessively soft and thus the stain resistance thereof is better.

It is noted that the mechanical properties of the paint film such as the 10% elastic modulus (Pi10) of the innermost layer of the paint film and the 10% elastic modulus (Po10) of the outermost layer of the paint film are measured by the methods described later.

The thickness (Ti) of the innermost layer of the paint film is larger than the thickness (To) of the outermost layer of the paint film. In other words, the paint film satisfies a relationship of Ti>To. If the relationship of Ti>To is satisfied, synergistically with the deformation effect due to the difference between the 10% elastic modulus of the innermost layer of the paint film and the 10% elastic modulus of the outermost layer of the paint film (i.e. Pi10>Po10), the outermost layer of the paint film more easily deforms, and thus the outermost layer of the paint film further bites into the club face on approach shots, and the obtained golf ball has enhanced spin performance on approach shots under a rough condition and enhanced spin performance on approach shots under a wet condition in a good balance.

The difference (Ti−To) between the thickness (Ti) of the innermost layer of the paint film and the thickness (To) of the outermost layer of the paint film is not particularly limited, but the difference (Ti−To) is preferably 1 μm or more, more preferably 2 μm or more, even more preferably 3 μm or more, and most preferably 4 μm or more, and is preferably 20 μm or less, more preferably 18 μm or less, even more preferably 15 μm or less, and most preferably 12 μm or less. If the difference (Ti−To) between the thickness (Ti) of the innermost layer of the paint film and the thickness (To) of the outermost layer of the paint film is 1 μm or more, the spin performance on approach shots under a rough condition and the spin performance on approach shots under a wet condition strike a better balance, and if the difference (Ti−To) between the thickness (Ti) of the innermost layer of the paint film and the thickness (To) of the outermost layer of the paint film is 20 μm or less, the durability or the stain resistance of the paint film is further enhanced.

The ratio (Ti/To) of the thickness (Ti) of the innermost layer of the paint film to the thickness (To) of the outermost layer of the paint film is not particularly limited, but the ratio (Ti/To) is preferably 1.1 or more, more preferably 1.2 or more, even more preferably 1.5 or more, and most preferably 1.8 or more, and is preferably 5 or less, more preferably 4.5 or less, even more preferably 4 or less, and most preferably 3.5 or less. If the ratio (Ti/To) of the thickness (Ti) of the innermost layer of the paint film to the thickness (To) of the outermost layer of the paint film is 1.1 or more, the spin performance on approach shots under a rough condition and the spin performance on approach shots under a wet condition strike a better balance, and if the ratio (Ti/To) of the thickness (Ti) of the innermost layer of the paint film to the thickness (To) of the outermost layer of the paint film is 5 or less, the durability or the stain resistance of the paint film is further enhanced.

The thickness (Ti) of the innermost layer of the paint film is not particularly limited, but the thickness (Ti) is preferably 6 μm or more, more preferably 7 μm or more, even more preferably 8 μm or more, and most preferably 9 μm or more, and is preferably 30 μm or less, more preferably 20 μm or less, even more preferably 18 μm or less, and most preferably 15 μm or less. If the thickness (Ti) of the innermost layer of the paint film is 6 μm or more, the spin performance on approach shots under a rough condition and the spin performance on approach shots under a wet condition strike a better balance, and if the thickness (Ti) of the innermost layer of the paint film is 30 μm or less, occurrence of crack in the paint film is suppressed, and thus the paint film has enhanced durability.

The thickness (To) of the outermost layer of the paint film is not particularly limited, but the thickness (To) is preferably 1 μm or more, more preferably 1.5 μm or more, even more preferably 2 μm or more, and most preferably 2.5 μm or more, and is preferably 15 μm or less, more preferably 10 μm or less, even more preferably 9 μm or less, and most preferably 7 μm or less. If the thickness (To) of the outermost layer of the paint film is 1 μm or more, the spin performance on approach shots under a rough condition and the spin performance on approach shots under a wet condition strike a better balance, and if the thickness (To) of the outermost layer of the paint film is 15 μm or less, the stain resistance of the paint film is further enhanced.

The total thickness (Ti+To) of the innermost layer and the outermost layer of the paint film is not particularly limited, but the total thickness (Ti+To) is preferably 7 μm or more, more preferably 10 μm or more, even more preferably 12 μm or more, and most preferably 14 μm or more, and is preferably 45 μm or less, more preferably 35 μm or less, even more preferably 25 μm or less, and most preferably 20 μm or less. If the total thickness (Ti+To) of the innermost layer and the outermost layer of the paint film is 7 μm or more, the spin performance on approach shots under a rough condition and the spin performance on approach shots under a wet condition strike a better balance, and if the total thickness (Ti+To) of the innermost layer and the outermost layer of the paint film is 45 μm or less, the paint film little affects the dimple pattern formed on the cover, and thus the golf ball has better flight performance.

The paint film preferably consists of the innermost layer and the outermost layer, but may further have an intermediate paint layer disposed between the innermost layer and the outermost layer. In the case that the paint film has the intermediate paint layer, the total thickness thereof is preferably 7 μm or more, more preferably 10 μm or more, even more preferably 12 μm or more, and most preferably 14 μm or more, and is preferably 45 μm or less, more preferably 35 μm or less, even more preferably 25 μm or less, and most preferably 20 μm or less. If the total thickness of the paint film is 7 μm or more, the spin performance on approach shots under a rough condition and the spin performance on approach shots under a wet condition strike a better balance, and if the total thickness of the paint film is 45 μm or less, the paint film little affects the dimple pattern formed on the cover, and thus the golf ball has better flight performance.

It is noted that the thickness of the paint film is measured by observing the cross section of the golf ball with a microscope (VHX-1000 available from Keyence Corporation).

1.2 Golf Ball Body

The golf ball body constituting the golf ball according to the present invention comprises a spherical core, an intermediate layer covering the spherical core, and a cover covering the intermediate layer.

1.2.1 Intermediate Layer and Cover

The intermediate layer is a layer formed between the spherical core and the cover. The intermediate layer may have a single layer, or may have two or more layers. In the present invention, in the case that the intermediate layer has two or more layers, in the comparison with the properties (10% elastic modulus, material hardness, thickness, etc.) of the intermediate layer, the comparison is conducted with the intermediate layer disposed outermost (hereinafter sometimes referred to as "outermost intermediate layer"), unless otherwise specified. It is noted that there is a case that a reinforcing layer is formed between the spherical core, the intermediate layer and the cover. However, the reinforcing layer generally has a thickness of 20 μm or less, and is excluded from the intermediate layer described in the present invention. In addition, the cover is the outermost layer of the golf ball body.

The 10% elastic modulus (M10) of the material constituting the intermediate layer is larger than the 10% elastic modulus (C10) of the material constituting the cover. In other words, the golf ball according to the present invention satisfies a relationship of M10>C10. If the relationship of M10>C10 is satisfied, since the cover of the golf ball is softer and is easier to deform than the intermediate layer, when the golf ball is hit, the deformation of the cover becomes predominant, the cover further bites into the club face and the friction of the cover with the club face is increased, and the spin performance on approach shots under a rough condition and the spin performance on approach shots under a wet condition are both enhanced.

The difference (M10−C10) between the 10% elastic modulus (M10) of the material constituting the intermediate layer and the 10% elastic modulus (C10) of the material constituting the cover is not particularly limited, but the difference (M10−C10) is preferably 50 kgf/cm$^2$ (4.9 MPa) or more, more preferably 75 kgf/cm$^2$ (7.4 MPa) or more, and even more preferably 100 kgf/cm$^2$ (9.8 MPa) or more, and is preferably 400 kgf/cm$^2$ (39.2 MPa) or less, more preferably 300 kgf/cm$^2$ (29.4 MPa) or less, and even more preferably 200 kgf/cm$^2$ (19.6 MPa) or less. If the difference (M10−C10) between the 10% elastic modulus (M10) of the material constituting the intermediate layer and the 10% elastic modulus (C10) of the material constituting the cover falls within the above range, the spin performance on approach shots under a rough condition and a wet condition is further enhanced.

The difference (Hm−Hc) between the Shore D hardness (Hm) of the material constituting the intermediate layer and the Shore D hardness (Hc) of the material constituting the cover is not particularly limited, but the difference (Hm-Hc) is preferably 20 or more, more preferably 25 or more, and even more preferably 30 or more, and is preferably 50 or less, more preferably 45 or less, and even more preferably 40 or less. If the difference (Hm−Hc) between the Shore D hardness (Hm) of the material constituting the intermediate layer and the Shore D hardness (Hc) of the material constituting the cover is 20 or more, the spin performance on approach shots under a rough condition and a wet condition is further enhanced, and if the difference (Hm−Hc) between the Shore D hardness (Hm) of the material constituting the intermediate layer and the Shore D hardness (Hc) of the material constituting the cover is 50 or less, the spin rate on driver shots is lowered, and thus the flight distance is further enhanced.

The ratio (Tm/Tc) of the thickness (Tm) of the intermediate layer to the thickness (Tc) of the cover is not particularly limited, but the ratio (Tm/Tc) is preferably 1.0 or more, more preferably 1.2 or more, and even more preferably 1.5 or more, and is preferably 5.0 or less, more preferably 4.0 or less, and even more preferably 3.5 or less. If the ratio (Tm/Tc) of the thickness (Tm) of the intermediate layer to the thickness (Tc) of the cover is 1.0 or more, the spin performance on approach shots under a rough condition and the spin performance on approach shots under a wet condition is further enhanced, and if the ratio (Tm/Tc) of the thickness (Tm) of the intermediate layer to the thickness (Tc) of the cover is 5.0 or less, the spin rate on driver shots is lowered and thus the flight distance is further enhanced, and the durability of the golf ball becomes better as well.

The 10% elastic modulus (M10) of the material constituting the intermediate layer is not particularly limited, but the 10% elastic modulus (M10) is preferably 100 kgf/cm$^2$ (9.8 MPa) or more, more preferably 125 kgf/cm$^2$ (12.3 MPa) or more, and even more preferably 150 kgf/cm$^2$ (14.7 MPa) or more, and is preferably 300 kgf/cm$^2$ (29.4 MPa) or less, more preferably 250 kgf/cm$^2$ (24.5 MPa) or less, and even more preferably 200 kgf/cm$^2$ (19.6 MPa) or less. If the 10% elastic modulus (M10) of the material constituting the intermediate layer falls within the above range, the spin performance on approach shots under a rough condition and the spin performance on approach shots under a wet condition are further enhanced. It is noted that in the case that the intermediate layer has two or more layers, it is preferable that the 10% elastic modulus of at least the material constituting the outermost layer of the intermediate layers falls within the above range, and it is more preferable that the 10% elastic modulus of the material constituting each layer of the intermediate layers falls within the above range.

The Shore D hardness (Hm) of the material constituting the intermediate layer is preferably 35 or more, more preferably 45 or more, and even more preferably 50 or more, and is preferably 70 or less, more preferably 68 or less, and even more preferably 65 or less. If the Shore D hardness (Hm) of the material constituting the intermediate layer is 35 or more, the spin rate on driver shots is lowered and thus the flight distance is further enhanced, and if the Shore D hardness (Hm) of the material constituting the intermediate layer is 70 or less, the golf ball has further enhanced shot feeling. It is noted that in the case that the intermediate layer has two or more layers, it is preferable that the Shore D hardness of at least the material constituting the outermost layer of the intermediate layers falls within the above range, and it is more preferable that the Shore D hardness of the material constituting each layer of the intermediate layers falls within the above range.

The thickness (Tm) of the intermediate layer is preferably 0.5 mm or more, more preferably 0.7 mm or more, and even more preferably 0.9 mm or more, and is preferably 3.0 mm or less, more preferably 2.0 mm or less, and even more preferably 1.2 mm or less. If the thickness (Tm) of the intermediate layer is 0.5 mm or more, the golf ball has further enhanced durability, and if the thickness (Tm) of the intermediate layer is 3.0 mm or less, the spherical core has a relatively large diameter, and thus the resilience performance thereof is enhanced. It is noted that in the case that the intermediate layer has two or more layers, it is preferable that the total thickness of the intermediate layers falls within the above range.

The 10% elastic modulus (C10) of the material constituting the cover is not particularly limited, but the 10% elastic modulus (C10) is preferably 5 kgf/cm$^2$ (0.5 MPa) or more, more preferably 7 kgf/cm$^2$ (0.7 MPa) or more, and even more preferably 9 kgf/cm$^2$ (0.9 MPa) or more, and is preferably less than 100 kgf/cm$^2$ (9.8 MPa), more preferably 50 kgf/cm$^2$ (4.9 MPa) or less, and even more preferably 25 kgf/cm$^2$ (9.8 MPa) or less. If the 10% elastic modulus (C10) of the material constituting the cover falls within the above range, the spin performance on approach shots under a rough condition and the spin performance on approach shots under a wet condition are enhanced.

The Shore D hardness (Hc) of the material constituting the cover is preferably 40 or less, more preferably 35 or less, and even more preferably 30 or less. If the Shore D hardness (Hc) of the material constituting the cover is 40 or less, the spin performance on approach shots under a rough condition and the spin performance on approach shots under a wet condition are further enhanced, and the shot feeling becomes better as well. The lower limit of the Shore D hardness (Hc) of the material constituting the cover is not particularly limited, but it is preferably 20 or more, more preferably 22 or more, and even more preferably 25 or more. If the Shore D hardness (Hc) of the material constituting the cover is 20 or more, the spin rate on driver shots is lowered and thus the flight distance is enhanced.

The thickness (Tc) of the cover is preferably 0.2 mm or more, more preferably 0.3 mm or more, and even more preferably 0.4 mm or more, and is preferably 2.0 mm or less, more preferably 1.5 mm or less, and even more preferably 1.0 mm or less. If the thickness (Tc) of the cover is 0.2 mm or more, the spin performance on approach shots under a rough condition and the spin performance on approach shots under a wet condition are further enhanced, and if the thickness (Tc) of the cover is 2.0 mm or less, the spin rate on driver shots is lowered and thus the flight distance is enhanced. It is noted that the thickness of the cover is a thickness of the portion where a dimple is not formed.

It is noted that the 10% elastic modulus (M10) and Shore D hardness (Hm) of the material constituting the intermediate layer, and the 10% elastic modulus (C10) and Shore D hardness (Hc) of the material constituting the cover are measured by the methods described later.

1.2.2 Spherical Core

The spherical core may have a single-layered construction or a multi-layered construction composed of two or more layers.

The diameter of the spherical core is preferably 37.5 mm or more, more preferably 37.7 mm or more, and even more preferably 38.0 mm or more. If the diameter of the spherical core is 37.5 mm or more, the resilience is better. The upper limit of the diameter of the spherical core is not particularly limited, and is preferably 41.5 mm or less, more preferably 41.0 mm or less, and even more preferably 40.5 mm or less.

When the spherical core has a diameter in a range from 37.5 mm to 41.5 mm, the compression deformation amount (shrinking amount along the compression direction) of the spherical core when applying a load from 98 N as an initial load to 1275 N as a final load to the spherical core is preferably 2.0 mm or more, more preferably 2.3 mm or more, and even more preferably 2.5 mm or more, and is preferably 4.0 mm or less, more preferably 3.5 mm or less, and even more preferably 3.0 mm or less. If the compression deformation amount is 2.0 mm or more, the shot feeling is better, and if the compression deformation amount is 4.0 mm or less, the resilience is better.

2 Material
2.1 Paint Film
Examples of the base resin constituting the paint film of the golf ball according to the present invention include a polyurethane, an epoxy resin, an acrylic resin, a vinyl acetate resin, and a polyester resin. Among them, the polyurethane is preferred. In the case that the base resin constituting the paint film is the polyurethane, tensile properties of the paint film can be adjusted by the formulation of the polyol composition or polyisocyanate composition, or the mixing ratio thereof. It is noted that the base resin constituting each layer of the paint film may be different from each other, but it is preferred that the base resin constituting all layers of the paint film is the polyurethane.

(Polyurethane Curing Type Paint Composition)

The paint film of the golf ball according to the present invention is preferably formed from a curing type paint composition containing a polyol composition and a polyisocyanate composition. In the present invention, in order to distinguish the polyol composition and the polyisocyanate composition, as a matter of convenience, the polyol composition is referred to as the base material, and the polyisocyanate composition is referred to as the curing agent. It is noted that the polyol composition may also be referred to as the curing agent, and the polyisocyanate composition may also be referred to as the base material. Further, the base material may also be referred to as the A agent, and the curing agent may also be referred to as the B agent.

(Polyol Composition)

The polyol composition contains a polyol. Examples of the polyol include a compound having two or more hydroxyl groups in the molecule thereof. The polyol compound may be used solely or as a mixture of at least two of them.

Examples of the polyol include a low molecular weight polyol having a molecular weight of less than 500 and a high molecular weight polyol having a number average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol, a polyester polyol, a polycaprolactone polyol, a polycarbonate polyol, a urethane polyol, an acrylic polyol, and a polyrotaxane. Examples of the polyether polyol include polyoxyethylene glycol (PEG), polyoxypropylene glycol (PPG), and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

In the present invention, as the polyol, the urethane polyol and/or the polyrotaxane is preferably used.

The urethane polyol suitably used in the present invention will be described. The urethane polyol is a compound having a plurality of urethane bonds in the molecule thereof, and having at least two hydroxyl groups in one molecule. Examples of the urethane polyol include a urethane prepolymer obtained by a reaction between a polyol component and a polyisocyanate component, under a condition that the hydroxyl group of the polyol component is excessive to the isocyanate group of the polyisocyanate component.

Examples of the polyol component constituting the urethane polyol include a polyether diol, a polyester diol, a polycaprolactone diol, and a polycarbonate diol, but the polyether diol is preferred. Examples of the polyether diol include polyoxyethylene glycol, polyoxypropylene glycol, and polyoxytetramethylene glycol. Among them, polyoxytetramethylene glycol is preferred.

The number average molecular weight of the polyether diol is preferably 600 or more, more preferably 650 or more, and even more preferably 700 or more, and is preferably 3000 or less, more preferably 2500 or less, and even more preferably 2000 or less. If the number average molecular weight of the polyether diol is 600 or more, the distance between crosslinking points in the paint film is long and the paint film is soft, thus the spin performance is enhanced. If the number average molecular weight is 3000 or less, the distance between crosslinking points in the paint film is not excessively long and thus the stain resistance of the paint film is better. It is noted that the number average molecular weight of the polyol component can be measured, for example, by gel permeation chromatography (GPC), using polystyrene as a standard material, tetrahydrofuran as an eluate, and an organic solvent system GPC column (e.g., "Shodex (registered trademark) KF series" available from Showa Denko K.K.) as a column.

The polyol component may include a low molecular weight polyol having a molecular weight of less than 500. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. The low molecular weight polyol may be used solely or as a mixture of at least two of them.

The polyol component constituting the urethane polyol preferably includes a triol component and a diol component. As the triol component, trimethylolpropane is preferred. The mixing ratio (triol component/diol component) of the triol component to the diol component is preferably 1.0 or more, more preferably 1.2 or more, and even more preferably 1.5 or more, and is preferably 4.0 or less, more preferably 3.0 or less, and even more preferably 2.5 or less in a molar ratio.

The polyisocyanate component that can constitute the urethane polyol is not particularly limited, as long as it has at least two isocyanate groups, and examples thereof include an aromatic polyisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The polyisocyanate may be used solely, or at least two of them can be used in combination.

The amount of the polyether diol in the urethane polyol is preferably 60 mass % or more, more preferably 62 mass % or more, and even more preferably 65 mass % or more. The polyether diol forms a soft segment in the paint film. Therefore, if the amount of the polyether diol is 60 mass % or more, the obtained golf ball has further enhanced spin performance.

The weight average molecular weight of the urethane polyol is preferably 4000 or more, more preferably 4300 or more, and even more preferably 4500 or more, and is preferably 20000 or less, more preferably 15000 or less, and even more preferably 10000 or less. If the weight average molecular weight of the urethane polyol is 4000 or more, the distance between crosslinking points in the paint film becomes long and the paint film becomes soft, thus the spin performance is enhanced. If the weight average molecular weight of the urethane polyol is 20000 or less, the distance between crosslinking points in the paint film does not become excessively long, and thus the stain resistance of the paint film becomes better.

The hydroxyl value of the urethane polyol is preferably 20 mgKOH/g or more, more preferably 30 mgKOH/g or more, and even more preferably 50 mgKOH/g or more, and is preferably 200 mgKOH/g or less, more preferably 150 mgKOH/g or less, and even more preferably 100 mgKOH/g or less. It is noted that the hydroxyl value can be measured according to JIS K 1557-1, for example, by an acetylation method.

The polyrotaxane suitably used in the present invention comprises a cyclodextrin, a linear molecule piercing through the cyclic structure of the cyclodextrin, and blocking groups located at both terminals of the linear molecule to prevent disassociation of the cyclic cyclodextrin molecules. The polyrotaxane is viscoelastic, since the cyclic cyclodextrin molecules are movable along the linear molecule that pierces through the cyclic cyclodextrin molecules (pulley effect). Even if a tension is applied to the polyrotaxane, the tension can be uniformly dispersed due to the pulley effect. Thus, the polyrotaxane has an excellent property that a crack or flaw very hardly occurs, unlike a conventional crosslinked polymer. It is noted that in the present invention, the polyrotaxane is regarded as the polyol component since a plurality of hydroxyl groups reactive with the isocyanate group exist on the cyclic structure of the cyclodextrin.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin such that the cyclic structure of the cyclodextrin is movable along and rotatable around the linear molecule. Examples of the linear molecule include polyalkylene, polyester, polyether, and polyacrylic acid. Among them, polyether is preferable, and polyethylene glycol is particularly preferable. Polyethylene glycol has less steric hindrance, and thus can easily penetrates the cyclic structure of the cyclodextrin in a manner of piercing through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has a functional group at both terminals thereof. If the linear molecule has the functional group, the linear molecule can easily react with the blocking group. Examples of the functional group include a hydroxyl group, carboxyl group, amino group, and thiol group.

The blocking group is not particularly limited, as long as it is located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number (inclusion amount) of the cyclodextrins penetrated by the linear molecule preferably ranges from 0.06 to 0.61, more preferably ranges from 0.11 to 0.48, and even more preferably ranges from 0.24 to 0.41, when the maximum inclusion amount is deemed as 1. If the number of the cyclodextrins is less than 0.06, the pulley effect may not be exerted, and if the number of the cyclodextrins exceeds 0.61, the cyclodextrins are very densely located, so that the movability of the cyclodextrin may decrease.

The polyrotaxane is preferably a polyrotaxane having at least a part of hydroxyl groups of the cyclodextrin being modified with a caprolactone chain. If at least a part of hydroxyl groups of the cyclodextrin of the polyrotaxane is modified with the caprolactone, steric hindrance between the polyrotaxane and the polyisocyanate is alleviated, so that the efficiency of a reaction with the polyisocyanate increases.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain —(CO(CH$_2$)$_5$O)$_n$H (n is a natural number of 1 to 100) is linked to the exterior side of the cyclic structure of the cyclodextrin via a —O—C$_3$H$_6$—O— group. "n" represents the degree of polymerization, and is preferably a natural number of 1 to 100, more preferably a natural number of 2 to 70, and even more preferably a natural number of 3 to 40. At another terminal of the caprolactone chain, a hydroxyl group is formed through the ring-opening polymerization. The hydroxyl group at the terminal of the caprolactone chain can react with the polyisocyanate.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more. If the ratio of the hydroxyl groups modified with the caprolactone chain falls within the above range, the hydrophobicity of the polyrotaxane increases, and the reactivity with the polyisocyanate increases.

FIG. 1 is an explanatory drawing illustrating a molecular structure of one example of the polyrotaxane used in the present invention. The polyrotaxane 200 comprises a cyclodextrin 212, a linear molecule 214 piercing through the cyclic structure of the cyclodextrin 212, and blocking groups 216 located at both terminals of the linear molecule 214 to prevent disassociation of the cyclic molecule, and a caprolactone chain 218 is linked to the exterior side of the cyclic structure of the cyclodextrin via a —O—C$_3$H$_6$—O— group (not shown).

The hydroxyl value of the polyrotaxane is preferably 10 mg KOH/g or more, more preferably 20 mg KOH/g or more, and even more preferably 40 mg KOH/g or more, and is preferably 400 mg KOH/g or less, more preferably 300 mg KOH/g or less, even more preferably 200 mg KOH/g or less, and most preferably 150 mg KOH/g or less. If the hydroxyl value of the polyrotaxane falls within the above range, the reactivity with the polyisocyanate increases, and thus the durability of the paint film becomes more favorable.

The total molecular weight of the polyrotaxane is preferably 30,000 or more, more preferably 50,000 or more, and even more preferably 100,000 or more, and is preferably 3,000,000 or less, more preferably 2,000,000 or less, and even more preferably 1,000,000 or less, in a weight average molecular weight. If the weight average molecular weight is 30,000 or more, the paint film has sufficient strength, and if the weight average molecular weight is 3,000,000 or less, the paint film has sufficient flexibility and thus approach performance of the golf ball increases. It is noted that the weight average molecular weight of the polyrotaxane can be measured, for example, by gel permeation chromatography (GPC) using polystyrene as a standard substance, tetrahydrofuran as an eluate, and an organic solvent system GPC column (e.g., "Shodex (registered trademark) KF series" available from Showa Denko K.K.) as a column.

Specific examples of the polyrotaxane modified with the polycaprolactone include SeRM super polymer SH3400P, SH2400P, and SH1310P available from Advanced Softmaterials Inc.

Preferable embodiments of the polyol composition are an embodiment containing the urethane polyol (embodiment 1); and an embodiment containing the polyrotaxane (embodiment 2).

In the embodiment 1, the amount of the urethane polyol in the polyol component of the polyol composition is preferably 60 mass % or more, more preferably 70 mass % or more, even more preferably 80 mass % or more. It is also preferred that the polyol component of the polyol composition of the embodiment 1 consists of the urethane polyol.

In the embodiment 2, the amount of the polyrotaxane in the polyol component of the polyol composition is preferably 10 mass % or more, more preferably 15 mass % or more, even more preferably 20 mass % or more, and is preferably 100 mass % or less, more preferably 90 mass % or less, even more preferably 85 mass % or less.

The polyol composition of the embodiment 2 preferably contains a polycaprolactone polyol. The mass ratio (polycaprolactone polyol/polyrotaxane) of the polycaprolactone polyol to the polyrotaxane is preferably 10/90 or more, more preferably 15/85 or more, and even more preferably 20/80 or more, and is preferably 90/10 or less, more preferably 85/15 or less, and even more preferably 80/20 or less. It is noted that in the case of using the polyol composition of the embodiment 2, as described later, the curing type paint composition preferably further contains, as a resin component, a vinyl chloride-vinyl acetate copolymer and/or a modified product thereof.

(Polyisocyanate Composition)

Next, the polyisocyanate composition will be described. The polyisocyanate composition contains a polyisocyanate compound. Examples of the polyisocyanate compound include a compound having at least two isocyanate groups.

Examples of the polyisocyanate compound include an aromatic diisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); an alicyclic diisocyanate or aliphatic diisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and a triisocyanate such as an allophanate-modified product, a biuret-modified product, an isocyanurate and an adduct of the above diisocyanate. The polyisocyanate may be used solely or as a mixture of at least two of them.

The allophanate-modified product is, for example, a triisocyanate obtained by further reacting a diisocyanate with a urethane bond formed through a reaction between a diisocyanate and a low molecular weight diol. The adduct is a triisocyanate obtained through a reaction between a diisocyanate and a low molecular weight triol such as trimethylolpropane or glycerin. The biuret-modified products is, for example, a triisocyanate having a biuret bond and represented by the following formula (1). The isocyanurate of diisocyanate is, for example, a triisocyanate represented by the following formula (2).

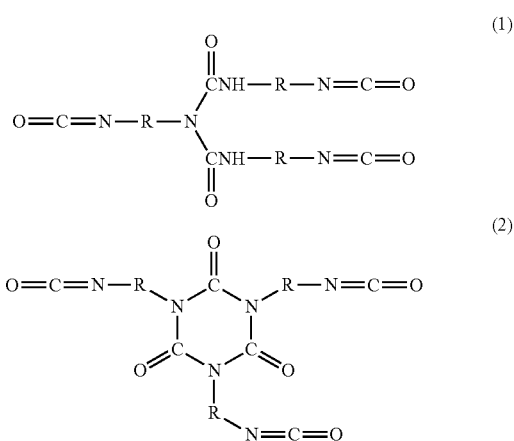

In the formulae (1) and (2), R represents a residue where the isocyanate group is removed from the diisocyanate.

The triisocyanate is preferably at least one member selected from the group consisting of an isocyanurate of hexamethylene diisocyanate, a biuret-modified product of hexamethylene diisocyanate, and an isocyanurate of isophorone diisocyanate.

In the present invention, the polyisocyanate composition preferably contains a triisocyanate compound. The amount of the triisocyanate compound in the polyisocyanate component of the polyisocyanate composition is preferably 50 mass % or more, more preferably 60 mass % or more, even more preferably 70 mass % or more. It is most preferable that the polyisocyanate component of the polyisocyanate composition consists of the triisocyanate compound.

The amount (NCO %) of the isocyanate group of the polyisocyanate contained in the polyisocyanate composition is preferably 0.5 mass % or more, more preferably 1 mass % or more, even more preferably 2 mass % or more, and is preferably 45 mass % or less, more preferably 40 mass % or less, even more preferably 35 mass % or less. It is noted that the amount (NCO %) of the isocyanate group of the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 available from DIC corporation; Desmodur Z4470, Desmodur N75MPA/X, Desmodur N3300, Desmodur L75 (C), and Sumidur E21-1 available from Bayer Co., Ltd.; Coronate HX, and Coronate HK available from Nippon Polyurethane Industry Co., Ltd.; Duranate 24A-100, Duranate 21S-75E, Duranate TPA-100, and Duranate TKA-100 available from Asahi Kasei Chemicals Corporation; and VESTANAT T1890 available from Degussa Co., Ltd.

In the curing reaction of the curing type paint composition, the molar ratio (NCO group/OH group) of the isocyanate group (NCO group) of the polyisocyanate composition to the hydroxyl group (OH group) of the polyol composition is preferably 0.1 or more, more preferably 0.2 or more. If the molar ratio (NCO group/OH group) is less than 0.1, the curing reaction may become insufficient. Further, if the molar ratio (NCO group/OH group) is too large, the amount of the isocyanate group is excessive, and the obtained paint film may become hard and fragile as well as the appearance of the obtained paint film may deteriorate. Thus, the molar ratio (NCO group/OH group) is preferably 1.6 or less, more preferably 1.5 or less, and even more preferably 1.4 or less. The reason why the appearance of the obtained paint film deteriorates if the amount of the isocyanate group in the paint becomes excessive is that an excessive amount of the isocyanate group may promote a reaction between the moisture in the air and the isocyanate group, thereby generating a lot of carbon dioxide gas. It is noted that, in considering the NCO/OH molar ratio in the curing reaction, the hydroxyl group of the polyol composition includes the hydroxyl group of the polyrotaxane and the polyol, but excludes the hydroxyl group of the modified product of the vinyl chloride-vinyl acetate copolymer, the modified silicone or the like which will be described later.

When the polyol composition of the embodiment 1 is used as the polyol composition, the polyisocyanate composition preferably contains the biuret-modified product of hexamethylene diisocyanate, the isocyanurate of hexamethylene diisocyanate, and the isocyanurate of isophorone diisocyanate. In the case that the biuret-modified product of hexamethylene diisocyanate and the isocyanurate of hexamethylene diisocyanate are used in combination, the mass ratio (biuret-modified product/isocyanurate) preferably ranges from 20/40 to 40/20, more preferably ranges from 25/35 to 35/25.

When the polyol composition of the embodiment 2 is used as the polyol composition, the polyisocyanate composition preferably contains a biuret-modified product of hexamethylene diisocyanate or an isocyanurate of isophorone diisocyanate.

The paint may be either a waterborne paint mainly containing water as a dispersion medium or a solvent-based paint mainly containing an organic solvent as a dispersion medium, but is preferably the solvent-based paint. In the case of the solvent-based paint, examples of the preferable solvent include toluene, isopropyl alcohol, xylene, methylethyl ketone, methylisobutyl ketone, ethylene glycol monomethyl ether, ethylbenzene, propylene glycol monomethyl ether, isobutyl alcohol, ethyl acetate, and butyl acetate. The solvent may be added in either of the polyol composition and the polyisocyanate composition, and in light of uniformly performing the curing reaction, the solvent is preferably added in the polyol composition and the polyisocyanate composition, respectively.

The curing type paint composition used in the present invention may further contain a vinyl chloride-vinyl acetate copolymer and/or a modified product thereof as a resin component. If the vinyl chloride-vinyl acetate copolymer and/or the modified product thereof is contained, the tackiness can be adjusted while maintaining abrasion resistance, and moderate tacky feeling is obtained. Examples of the modification method include a method of copolymerizing a monomer (e.g., vinyl alcohol, hydroxyalkyl acrylate) copolymerizable with vinyl chloride and vinyl acetate; and a method of partially or completely saponifying a vinyl chloride-vinyl acetate copolymer to introduce hydroxyl groups therein.

The amount of the vinyl chloride component in the vinyl chloride-vinyl acetate copolymer and/or the modified product thereof is preferably 1 mass % or more, more preferably 20 mass % or more, and is preferably 99 mass % or less, more preferably 95 mass % or less. In the present invention, as the vinyl chloride-vinyl acetate copolymer and/or the modified product thereof, a hydroxyl group-modified vinyl chloride-vinyl acetate copolymer is preferably used. The hydroxyl group-modified vinyl chloride-vinyl acetate copolymer is obtained, for example, by a method of copolymerizing vinyl chloride, vinyl acetate and a monomer having a hydroxyl group (e.g., polyvinyl alcohol, hydroxyalkyl acrylate), or by a method of partially or completely saponifying a vinyl chloride-vinyl acetate copolymer. Specific examples of the vinyl chloride-vinyl acetate copolymer and/or the modified product thereof include Solbin (registered trademark) A, Solbin AL, Solbin TA2, and Solbin TA3 available from Nissin Chemical Industry Co., Ltd.

The vinyl chloride-vinyl acetate copolymer and/or the modified product thereof is preferably added in the polyol composition. The amount of the vinyl chloride-vinyl acetate copolymer and/or the modified product thereof in the polyol composition is preferably 5 mass % or more, more preferably 10 mass % or more, and even more preferably 15 mass % or more, and is preferably 50 mass % or less, more preferably 45 mass % or less, and even more preferably 40 mass % or less.

The curing type paint preferably further contains a modified silicone. If the modified silicone is contained as a leveling agent, unevenness of the coated surface can be reduced, and thus a smooth coated surface can be formed on the surface of the golf ball. Examples of the modified silicone include a modified silicone having an organic group being introduced to a side chain or a terminal of a polysiloxane skeleton, a polysiloxane block copolymer obtained by copolymerizing a polyether block and/or a polycaprolactone block, etc. with a polysiloxane block, and a modified silicone having an organic group being introduced to a side chain or a terminal of the polysiloxane block copolymer. The polysiloxane skeleton or the polysiloxane block is preferably linear, and examples thereof include dimethyl polysiloxane, methylphenyl polysiloxane, and methyl hydrogen polysiloxane. Examples of the organic group include an amino group, epoxy group, mercapto group, and carbinol group. In the present invention, as the modified silicone oil, a polydimethylsiloxane-polycaprolactone block copolymer is preferably used, and a terminal carbinol-modified polydimethylsiloxane-polycaprolactone block copolymer is more preferably used. This is because these block copolymers have excellent compatibility with the caprolactone-modified polyrotaxane and the polycaprolactone polyol. Specific examples of the modified silicone used in the present invention include DBL-C31, DBE-224, and DCE-7521 available from Gelest, Inc.

A conventionally known catalyst can be employed for the curing reaction. Examples of the catalyst include a monoamine such as triethyl amine and N,N-dimethylcyclohexylamine; a polyamine such as N,N,N',N'-tetramethylethylene diamine and N,N,N',N'',N''-pentamethyldiethylene triamine; a cyclic diamine such as 1,8-diazabicyclo[5.4.0]-7-undecene (DBU) and triethylene diamine; a tin catalyst such as dibutyl tin dilaurate and dibutyl tin diacetate. These catalysts may be used solely, or two or more of the catalysts may be used in combination. Among them, the tin catalyst such as dibutyl tin dilaurate and dibutyl tin diacetate is preferred, and in particular, dibutyl tin dilaurate is preferably used.

The curing type paint may further contain additives generally included in the paint for a golf ball, such as a filler, ultraviolet absorber, antioxidant, light stabilizer, fluorescent brightener, anti-blocking agent, leveling agent, slip agent, and viscosity modifier, where necessary.

It is preferable that in the paint film of the golf ball according to the present invention, the base resin constituting the innermost layer of the paint film is a polyurethane having the urethane polyol as a constituent component, and the base resin constituting the outermost layer of the paint film is a polyurethane having the polyrotaxane as a constituent component.

The innermost layer of the paint film is preferably formed from a curing type paint composed of a polyol composition containing the urethane polyol and a polyisocyanate composition. The polyisocyanate composition preferably contains a biuret-modified product of hexamethylene diisocyanate, an isocyanurate of hexamethylene diisocyanate and an isocyanurate of isophorone diisocyanate.

The outermost layer of the paint film is preferably formed from a curing type paint composed of a polyol composition containing the polyrotaxane and a polyisocyanate composition. The polyisocyanate composition preferably contains a biuret-modified product of hexamethylene diisocyanate or an isocyanurate of isophorone diisocyanate. In this case, the curing type paint composition preferably further contains the vinyl chloride-vinyl acetate copolymer and/or the modified product thereof, and the modified silicone.

Next, the method of applying the curing type paint composition of the present invention will be described. The method of applying the curing type paint composition is not limited, a conventionally known method can be adopted, and examples thereof include a spray coating and electrostatic coating.

In the case of performing the spray coating with an air gun, the polyol composition and the polyisocyanate composition are fed with respective pumps and continuously mixed with a line mixer located in the stream line just before the air gun, and the obtained mixture is air-sprayed. Alternatively, the polyol composition and the polyisocyanate composition are air-sprayed respectively with an air spray system provided with a device for controlling the mixing ratio thereof. The paint application may be conducted by spraying the paint one time or overspraying the paint multiple times.

The curing type paint applied to the golf ball body can be dried, for example, at a temperature ranging from 30° C. to 70° C. for 1 hour to 24 hours to form the paint film.

2.2 Golf Ball Body
2.2.1 Spherical Core

The spherical core may use a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its advantageous resilience.

As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable. The amount of the co-crosslinking agent is preferably 20 parts by mass or more and 65 parts by mass or less, with respect to 100 parts by mass of the base rubber.

As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator to be used is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, diphenyl disulfides (e.g. diphenyl disulfide, pentabromodiphenyl disulfide), thiophenols or thionaphthols (e.g. 2-thionaphthol) may be preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber.

The core rubber composition may further contain a carboxylic acid and/or a metal salt thereof. As the carboxylic acid and/or the metal salt thereof, a carboxylic acid having 1 to 30 carbon atoms and/or a metal salt thereof is preferred. As the carboxylic acid, an aliphatic carboxylic acid (fatty acid) or an aromatic carboxylic acid (e.g. benzoic acid) may be used. It is noted that the carboxylic acid and/or the metal salt thereof excludes the α,β-unsaturated carboxylic acid having 3 to 8 carbon atoms or the metal salt thereof used as the co-crosslinking agent.

The amount of the carboxylic acid and/or the metal salt thereof is preferably 1 part by mass or more and 40 parts by mass or less, with respect to 100 parts by mass of the base rubber. It is noted that there are cases where the surface of zinc acrylate used as the co-crosslinking agent is treated with zinc stearate to improve the dispersibility to the rubber. In the case of using zinc acrylate whose surface is treated with zinc stearate, the amount of zinc stearate used as a surface treating agent is included in the amount of the carboxylic acid and/or the metal salt thereof.

The core rubber composition may further contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be determined appropriately depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

2.2.2 Intermediate Layer

The material constituting the intermediate layer (hereinafter referred to as "intermediate layer composition" occasionally.) is not particularly limited, but it preferably contains an ionomer resin.

Examples of the ionomer resin include a product obtained by neutralizing at least a part of carboxyl groups in a binary copolymer composed of an olefin and an α, β-unsaturated carboxylic acid having 3 to 8 carbon atoms with a metal ion, a product obtained by neutralizing at least a part of carboxyl groups in a ternary copolymer composed of an olefin, an α, β-unsaturated carboxylic acid having 3 to 8 carbon atoms and an α, β-unsaturated carboxylic acid ester with a metal ion, or a mixture of those. The olefin is preferably an olefin having 2 to 8 carbon atoms. Examples of the olefin include ethylene, propylene, butene, pentene, hexene, heptene, and octene. Ethylene is particularly preferred. Examples of the α, β-unsaturated carboxylic acid having 3 to 8 carbon atoms include acrylic acid, methacrylic acid, fumaric acid, maleic acid and crotonic acid. Acrylic acid and methacrylic acid are particularly preferred. In addition, examples of the α, β-unsaturated carboxylic acid ester include methyl ester, ethyl ester, propyl ester, n-butyl ester, isobutyl ester of acrylic acid, methacrylic acid, fumaric acid and maleic acid. Acrylic acid ester and methacrylic acid ester are particularly preferred. Among these, the ionomer resin is preferably a metal ion-neutralized product of a binary copolymer composed of ethylene and (meth)acrylic acid and a metal ion-neutralized product of a ternary copolymer composed of ethylene, (meth)acrylic acid and (meth)acrylic acid ester.

Specific examples of the ionomer resin include trade name "Himilan (registered trademark) (e.g. a binary copolymer ionomer resin such as Himilan 1555 (Na), Himilan 1557 (Zn), Himilan 1605 (Na), Himilan 1706 (Zn), Himilan 1707 (Na), Himilan AM3711 (Mg), Himilan AM7329 (Zn), Himilan AM7337 (Na); and a ternary copolymer ionomer such as Himilan 1856 (Na), Himilan 1855 (Zn))" available from Du Pont-Mitsui Polychemicals Co., Ltd.

Further, examples of the ionomer resin also include "Surlyn (registered trademark)" (e.g. a binary copolymer ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and a ternary copolymer ionomer resin such as Surlyn 8120 (Na), Surlyn 8320 (Na), Surlyn 9320 (Zn), Surlyn 6320 (Mg), HPF 1000 (Mg), HPF 2000 (Mg))" available from E.I. du Pont de Nemours and Company.

Further, examples of the ionomer resin also include "Iotek (registered trademark)" (e.g. a binary copolymer ionomer resin such as Iotek 8000 (Na), Iotek 8030 (Na), Iotek 7010 (Zn), Iotek 7030 (Zn); and a ternary copolymer ionomer resin such as Iotek 7510 (Zn), Iotek 7520 (Zn))" available from ExxonMobil Chemical Corporation.

It is noted that Na, Zn, Li, and Mg or the like described in the parentheses after the trade names of the ionomer resin indicate metal ion type for neutralizing the ionomer resin. The ionomer resin may be used solely, or at least two of them may be used in combination.

The resin component of the material constituting the intermediate layer preferably consists of the ionomer resin, but the resin component of the material constituting the intermediate layer may further contain other resin components. Specific examples of the other resin components include an ethylene-methacrylic acid copolymer having a trade name of "Nucrel (registered trademark)" available from Du Pont-Mitsui Polychemicals Co., Ltd.; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema Inc.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation.

The amount of the ionomer resin in the resin component constituting the intermediate layer is preferably 50 mass % or more, more preferably 70 mass % or more, and even more preferably 90 mass % or more.

The intermediate layer may further contain a weight adjusting agent such as barium sulfate and tungsten, an antioxidant, a pigment, or the like, in addition to the above resin component. The intermediate layer may be formed by directly injection molding the intermediate layer composition on the spherical core.

2.2.3 Cover

The material constituting the cover (hereinafter referred to as "cover composition" occasionally.) is not particularly limited, but it preferably contains a polyurethane.

The polyurethane may be either a thermoplastic polyurethane or a thermosetting polyurethane. The thermoplastic polyurethane is a polyurethane exhibiting plasticity by heating and generally means a polyurethane having a linear chain structure of a high-molecular weight to a certain extent. On the other hand, the thermosetting polyurethane (two-component curing type polyurethane) is a polyurethane obtained by polymerization through a reaction between a low-molecular weight urethane prepolymer and a curing agent (chain extender) when molding the cover. The thermosetting polyurethane includes a polyurethane having a linear chain structure or a polyurethane having a three-dimensional crosslinked structure depending on the number of the functional group of the prepolymer or the curing agent (chain extender) to be used. As the polyurethane, the thermoplastic elastomer is preferable. Specific examples of the thermoplastic polyurethane elastomer include trade name of "Elastollan (registered trademark)" available from BASF Japan Ltd.

The resin component of the material constituting the cover preferably consists of the polyurethane, but the resin component of the material constituting the cover may further contain other resin components. Specific examples of the other resin components include the above-exemplified ionomer resin, an ethylene-methacrylic acid copolymer having a trade name of "Nucrel (registered trademark)" available from Du Pont-Mitsui Polychemicals Co., Ltd.; a thermoplastic polyamide elastomer having a trade name of "Pebax (registered trademark)" available from Arkema Inc.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation.

The amount of the polyurethane in the resin component constituting the cover is preferably 50 mass % or more, more preferably 70 mass % or more, and even more preferably 90 mass % or more.

The cover may contain a pigment component such as a white pigment, a blue pigment and a red pigment, a weight adjusting agent such as calcium carbonate and barium sulfate, a dispersant, an antioxidant, an ultraviolet absorber, a light stabilizer (e.g. hindered amine light stabilizer), a fluorescent material or a fluorescent brightener, or the like, in addition to the above resin component, as long as they do not impair the performance of the cover.

The method for molding the cover from the cover composition is not particularly limited, and examples thereof include a method of injection molding the cover composition directly onto the spherical body composed of the spherical core and the intermediate layer; and a method of molding the cover composition into hollow shells, covering the spherical body composed of the spherical core and the intermediate layer with a plurality of the hollow shells and compression molding the spherical body with a plurality of the hollow shells (preferably a method of molding the cover composition into half hollow-shells, covering the spherical body composed of the spherical core and the intermediate layer with two of the half hollow-shells and compression molding the spherical body with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

The total number of the dimples formed on the cover is preferably 200 or more and 500 or less. If the total number of the dimples is less than 200, the dimple effect is hardly obtained. If the total number exceeds 500, the dimple effect is hardly obtained because the size of the respective dimples is small. The shape (shape in a plan view) of the formed dimple includes, for example, without limitation, a circle; a polygonal shape such as a roughly triangular shape, a roughly quadrangular shape, a roughly pentagonal shape, and a roughly hexagonal shape; and another irregular shape. The shape may be employed solely, or two or more of the shapes may be employed in combination.

3. Golf Ball

The golf ball according to the present invention is not particularly limited, as long as it comprises a golf ball body and a paint film formed on a surface of the golf ball body, wherein the golf ball body has a spherical core, an intermediate layer covering the spherical core, and a cover covering the intermediate layer, and the paint film has a multi-layered construction composed of two or more layers. Examples of the construction of the golf ball body include, but are not limited to, a three-piece golf ball having a single-layered core, a single-layered intermediate layer covering the single-layered core, and a single-layered cover covering the single-layered intermediate layer; a four-piece golf ball having a dual-layered core, a single-layered intermediate layer covering the dual-layered core, and a single-layered cover covering the single-layered intermediate layer; a four-piece golf ball having a single-layered core, a dual-layered intermediate layer covering the single-layered core, and a single-layered cover covering the dual-layered intermediate layer; a five-piece golf ball having a dual-layered core, a dual-layered intermediate layer covering the dual-layered core, and a single-layered cover covering dual-layered intermediate layer.

Figure 2:
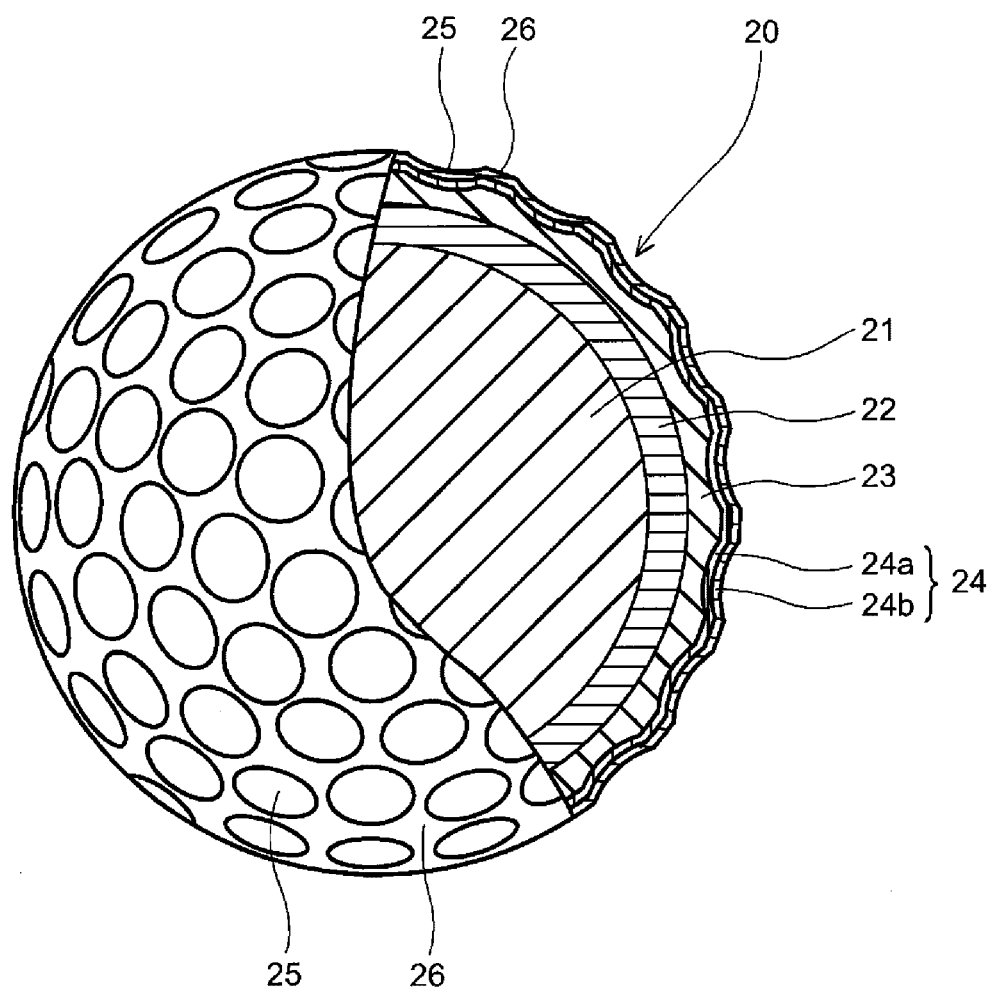
FIG. 2 is a partially cutaway cross-sectional view showing a golf ball according to one embodiment of the present invention.

FIG. 2 is a partially cutaway cross-sectional view showing a golf ball 20 according to one embodiment of the present invention. The golf ball 20 comprises a spherical core 21, an intermediate layer 22 covering the spherical core 21, a cover 23 covering the intermediate layer 22, and a paint film 24 formed on a surface of the cover 23. The paint film 24 is composed of an inner layer 24a and an outer layer 24b. On the surface of the cover 23, a plurality of dimples 25 are formed. On the surface of the cover 23, a part other than the dimples 25 is a land 26.

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, more preferably 42.80 mm or less. The golf ball preferably has a mass of 40 g or more and 50 g or less. In light of obtaining greater inertia, the golf ball more preferably has a mass of 44 g or more, even more preferably 45.00 g or more. In light of satisfying a regulation of USGA, the golf ball preferably has a mass of 45.93 g or less.

When the golf ball has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard and thus the shot feeling thereof becomes better. On the other hand, if the compression deformation amount is 4.0 mm or less, the resilience of the golf ball becomes better.

EXAMPLES

Next, the present invention will be described in detail by way of examples. However, the present invention is not limited to the examples described below, and various changes and modifications without departing from the gist of the present invention are included in the scope of the present invention.

[Evaluation Method]

(1) Compression Deformation Amount (mm)

The deformation amount of the core or golf ball along the compression direction (shrinking amount of the core or golf ball along the compression direction), when applying a load from 98 N as an initial load to 1275 N as a final load to the core or golf ball, was measured.

(2) Material Hardness (Shore D Hardness)

Sheets with a thickness of about 2 mm were produced by injection molding the intermediate layer composition or the cover composition, and stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore D".

(3) Mechanical Properties of Paint Film

The polyol composition and the polyisocyanate composition were blended to prepare a paint, and the paint was dried and cured at 40° C. for 4 hours to prepare a paint film (thickness: 0.05 mm). According to JIS-K7161, the paint film was punched into a dumbbell-shape (gauge length: 20 mm, width of parallel part: 10 mm) to prepare a test piece. The properties of the paint film were measured using a tensile tester (tension speed: 50 mm/min, measurement temperature: 23° C.) available from Shimadzu Corporation, and the elastic modulus at 10% elongation was calculated.

(4) Thickness of Paint Film

The thickness of the paint film was measured by observing the cross section of the golf ball with a microscope (VHX-1000 available from Keyence Corporation).

(5) Mechanical Properties of Intermediate Layer and Cover

A sheet with a thickness of about 2 mm was produced by injection molding the cover composition or the intermediate layer composition, and stored at 23° C. for two weeks. According to ISO 527-1, a dumbbell-shape test piece (gauge length: 73 mm, width of parallel part: 5.0 mm) was prepared from the sheet. The properties of the test piece were measured using a tensile tester (tension speed: 100 mm/min, measurement temperature: 23° C.) available from Shimadzu Corporation, and the elastic modulus at 10% elongation was calculated.

(6) Spin Rate, Ball Initial Velocity and Flight Distance on Driver Shots (W#1)

A driver (trade name "Z745", Shaft hardness: X, Loft angel: 8.5°, available from Dunlop Sports Co. Limited) was installed on a swing robot available from Golf Laboratories, Inc. The golf ball was hit at a head speed of 50 m/sec, and the ball initial velocity (m/sec) and spin rate (rpm) right after hitting the golf ball, and the flight distance (the distance (m) from the launch point to the stop point) were measured. This measurement was conducted twelve times for each golf ball, and the average value thereof was adopted as the measurement value for the golf ball. It is noted that a sequence of photographs of the hit golf ball were taken for measuring the spin rate right after hitting the golf ball.

(7) Spin Rate on Approach Shots (AP) (Rough Condition, Wet Condition)

A sand wedge (CG 15 forged wedge (52°) available from Cleveland Golf) was installed on a swing robot available from Golf Laboratories, Inc. The golf ball was hit at a head speed of 16 m/sec, and the spin rate (rpm) thereof was measured by continuously taking a sequence of photographs of the hit golf ball. The measurement was conducted ten times for each golf ball, and the average value thereof was adopted as the spin rate for the golf ball. In Tables 5, 6, the spin rate of each golf ball is shown as a difference from the spin rate of the golf ball No. 12. The spin rate under a rough condition is a spin rate measured in a state that wild grass (two pieces) existed between the club face and the golf ball, and the spin rate under a wet condition is a spin rate measured in a state that the club face and the golf ball were wetted with water.

[Production of Golf Ball]

1. Production of Spherical Core

Spherical core of Golf balls No. 1 to 6 and 8 to 21

The materials having the formulation shown in the core rubber composition No. 1 in Table 1 were kneaded with a kneading roll to obtain a rubber composition. The rubber composition was heat-pressed in upper and lower molds, each having a hemispherical cavity, at 150° C. for 20 minutes to obtain a single-layered spherical core. It is noted that in Table 1, the amount of barium sulfate was adjusted such that the golf ball had a mass of 45.3 g.

Spherical Core of Golf Ball No. 7

The materials having the formulation shown in the core rubber composition No. 2 in Table 1 were kneaded with a kneading roll to obtain an inner core rubber composition. The inner core rubber composition was heat-pressed in upper and lower molds, each having a hemispherical cavity, at 170° C. for 15 minutes to obtain an inner core. Next, the materials having the formulation shown in the core rubber composition No. 3 in Table 1 were kneaded with a kneading roll to obtain an outer core rubber composition. The outer core rubber composition was used to mold half shells. The inner core was covered with two of the half shells. The inner core together with the half shells was heat-pressed in upper and lower molds, each having a hemispherical cavity, at 150° C. for 20 minutes to obtain a spherical core (diameter of inner core: 15 mm, thickness of outer core: 12.35 mm). It is noted that in Table 1, the amount of barium sulfate was adjusted such that the golf ball had a mass of 45.3 g, and the specific gravity of the inner core and the specific gravity of the outer core had the same value.

TABLE 1

| | | Core rubber composition No. | | |
|---|---|---|---|---|
| | | 1 | 2 | 3 |
| Formulation (parts by mass) | Polybutadiene rubber | 100 | 100 | 100 |
| | Zinc acrylate | 29.5 | — | 33 |
| | Magnesium acrylate | — | 35 | — |
| | Methacrylic acid | — | 28 | — |
| | Zinc oxide | 5 | — | 5 |
| | Barium sulfate | Appropriate amount* | Appropriate amount* | Appropriate amount* |
| | 2-Thionaphthol | 0.1 | — | — |
| | Benzoic acid | 2 | — | — |
| | Pentabromodiphenyl disulfide | 0.3 | — | 0.3 |
| | Dicumyl peroxide | 0.9 | 1.3 | 0.9 |

Polybutadiene rubber: "BR730 (high cis-bond polybutadiene)" available from JSR Corporation
Zinc acrylate: "ZN-DA90S" available from Nisshoku Techno Fine Chemical Co., Ltd.
Magnesium acrylate: "MAGSARAT (registered trademark) 150ST" available from Kyowa Chemical Industry Co., Ltd.
Methacrylic acid: available from Mitsubishi Rayon Co., Ltd.
Zinc oxide: "Ginrei R" available from Toho Zinc Co., Ltd.
Barium sulfate: "Barium Sulfate BD" available from Sakai Chemical Industry Co., Ltd.
Dicumyl peroxide: "Percumyl (registered trademark) D" available from NOF Corporation
Pentabromodiphenyl disulfide: available from Kawaguchi Chemical Industry Co., Ltd.
2-Thionaphthol: available from Tokyo Chemical Industry Co., Ltd.
Benzoic acid: available from Emerald Kalama Chemical Co., Ltd.

2. Preparation of Intermediate Layer Composition and Cover Composition

The materials having the formulations shown in Tables 2, 3 were mixed with a twin-screw kneading extruder to prepare the intermediate layer composition and cover composition in a pellet form. The extruding conditions were a screw diameter of 45 mm, a screw rotational speed of 200 rpm, and screw L/D=35, and the mixtures were heated to 160° C. to 230° C. at the die position of the extruder.

TABLE 2

| | | Intermediate layer composition No. | | | |
|---|---|---|---|---|---|
| | | M1 | M2 | M3 | M4 |
| Formulation (parts by mass) | Surlyn 8150 | — | 50 | — | — |
| | Himilan 1605 | 47 | — | — | — |
| | Himilan AM7329 | 50 | 50 | — | — |
| | Himilan AM7337 | — | — | — | 26 |
| | Himilan 1555 | — | — | 47 | 40 |
| | Himilan 1557 | — | — | 46 | — |
| | Rabalon T3221C | 3 | — | 7 | 34 |
| | Titanium oxide | 4 | 4 | 4 | 4 |
| Properties | Material hardness (Shore D) | 63 | 68 | 57 | 43 |
| | 10% Elastic modulus (kgf/cm$^2$) | 170 | 230 | 110 | 45 |

Surlyn (registered trademark) 8150: sodium ion neutralized ethylene-methacrylic acid copolymer ionomer resin available from E.I. du Pont de Nemours and Company
Himilan (registered trademark) 1605: sodium ion neutralized ethylene-methacrylic acid copolymer ionomer resin available from Du Pont-Mitsui Polychemicals Co., Ltd.
Himilan AM7329: zinc ion neutralized ethylene-methacrylic acid copolymer ionomer resin available from Du Pont-Mitsui Polychemicals Co., Ltd.
Himilan AM7337: sodium ion neutralized ethylene-methacrylic acid copolymer ionomer resin available from Du Pont-Mitsui Polychemicals Co., Ltd.
Himilan 1555: sodium ion neutralized ethylene-methacrylic acid copolymer ionomer resin available from Du Pont-Mitsui Polychemicals Co., Ltd.
Himilan 1557: zinc ion neutralized ethylene-methacrylic acid copolymer ionomer resin available from Du Pont-Mitsui Polychemicals Co., Ltd.
Rabalon (registered trademark) T3221C: thermoplastic styrene elastomer available from Mitsubishi Chemical Corporation
Titanium oxide: A220 available from Ishihara Sangyo Kaisha, Ltd.

TABLE 3

| | | \multicolumn{4}{c}{Cover composition No.} | | | |
|---|---|---|---|---|---|
| | | C1 | C2 | C3 | C4 |
| Formulation (parts by mass) | Elastollan NY80A | 100 | — | — | — |
| | Elastollan NY84A | — | 100 | — | — |
| | Elastollan NY88A | — | — | 100 | — |
| | Elastollan NY97A | — | — | — | — |
| | Himilan 1605 | — | — | — | 47 |
| | Himilan AM7329 | — | — | — | 50 |
| | Rabalon T3221C | — | — | — | 3 |
| | TINUVIN 770 | 0.2 | 0.2 | 0.2 | — |
| | Titanium oxide | 4 | 4 | 4 | 4 |
| Properties | Material hardness (Shore D) | 27 | 31 | 36 | 63 |
| | 10% Elastic modulus (kgf/cm$^2$) | 10 | 12 | 18 | 170 |

Elastollan (registered trademark) NY80A: thermoplastic polyurethane elastomer available from BASF Japan Ltd.
Elastollan NY84A: thermoplastic polyurethane elastomer available from BASF Japan Ltd.
Elastollan NY88A: thermoplastic polyurethane elastomer available from BASF Japan Ltd.
TINUVIN (registered trademark) 770: hindered amine light stabilizer available from BASF Japan Ltd.
Himilan 1605: sodium ion neutralized ethylene-methacrylic acid copolymer ionomer resin available from Du Pont-Mitsui Polychemicals Co., Ltd.
Himilan AM7329: zinc ion neutralized ethylene-methacrylic acid copolymer ionomer resin available from Du Pont-Mitsui Polychemicals Co., Ltd.
Rabalon T3221C: thermoplastic styrene elastomer available from Mitsubishi Chemical Corporation
Titanium oxide: A220 available from Ishihara Sangyo Kaisha, Ltd.

3. Production of Intermediate Layer

The intermediate layer composition obtained above was directly injection molded on the spherical core obtained as described above to form the intermediate layer covering the spherical core. Upper and lower molds for molding have a hemispherical cavity and a retractable hold pin for holding the spherical core. When molding the intermediate layer, the hold pin was protruded to hold the spherical core after the spherical core was charged, and the intermediate layer composition was charged into the mold and cooled. The mold was opened and the spherical body was ejected.

5. Molding of Cover

The cover composition in a pellet form was charged into each concave portion of a lower mold of a mold for molding half shell one by one, and compressed to mold half shells. The compression molding was carried out under a condition of a molding temperature: 170° C., a molding time: 5 min, and a molding pressure: 2.94 MPa. The spherical body composed of the spherical core and the intermediate layer, and the half shells were charged into a final mold provided with a plurality of pimples on the cavity surface, and the cover was molded by compression molding. The compression molding was carried out under a condition of a molding temperature: 150° C., a molding time: 2 min, and a molding pressure: 9.8 MPa. A plurality of dimples having an inverted shape of the pimples were formed on the cover.

6. Preparation of Polyol Composition 6.1 Polyol Composition No. 1 (Urethane Polyol)

As the polyol component, polytetramethylene ether glycol (PTMG, number average molecular weight: 650) and trimethylolpropane (TMP) were dissolved in a solvent (a mixed solvent of toluene/methyl ethyl ketone=15/85 (mass ratio)). The molar ratio (PTMG:TMP) was 1.8:1.0. Then, dibutyltin dilaurate which was used as a catalyst was added therein in an amount of 0.1 mass % with respect to the total amount of the base material. While keeping the temperature of the obtained polyol solution at 80° C., isophorone diisocyanate (IPDI) which was used as a first polyisocyanate component was added dropwise to the polyol solution and mixed. It is noted that the molar ratio (NCO/OH) of the NCO group in the polyisocyanate component to the OH group in the polyol component was 0.6. After adding of isophorone diisocyanate, stirring was continued until the isocyanate group no longer existed. Then, the reaction liquid was cooled to the room temperature to obtain the urethane polyol (amount of solid component: 30 mass %). In the obtained polyol composition No. 1, the amount of PTMG was 67 mass %, the hydroxyl value of the solid component was 67.4 mgKOH/g, and the urethane polyol had a weight average molecular weight of 4867.

6-2. Polyol Composition No. 2 (Polyrotaxane Composition)

50 parts by mass of a polyrotaxane ("SeRM (registered trademark) super polymer SH3400P (a polyrotaxane having a cyclodextrin, at least a part of hydroxyl groups thereof being modified with a caprolactone chain via —O—C$_3$H$_6$—O— group, a linear molecule of polyethylene glycol and a blocking group of an adamantyl group; molecular weight of linear molecule: 35,000, hydroxyl value: 72 mg KOH/g, total molecular weight of polyrotaxane: 700,000 in weight average molecular weight)" available from Advanced Softmaterials Inc.), 28 parts by mass of polycaprolactone polyol ("Placcel (registered trademark) 308" available from Daicel Chemical Industries, Ltd.), 22 parts by mass of a vinyl chloride-vinyl acetate-vinyl alcohol copolymer ("Solbin (registered trademark) AL (hydroxyl value: 63.4 mg KOH/g)" available from Nissin Chemical Industry Co., Ltd.), 0.1 part by mass of a modified silicone (DBL-C31 available from Gelest, Inc.), 0.01 part by mass of dibutyltin dilaurate, and 100 parts by mass of a solvent (a mixed solvent of xylene/methylethyl ketone=70/30 (mass ratio)) were mixed to prepare the polyol composition No. 2.

7. Preparation of Polyisocyanate Composition 7-1. Polyisocyanate Composition No. 1

30 parts by mass of an isocyanurate of hexamethylene diisocyanate (Duranate (registered trademark) TKA-100 (NCO amount: 21.7 mass %) available from Asahi Kasei Chemicals Corporation), 30 parts by mass of a biuret-modified product of hexamethylene diisocyanate (Duranate 21S-75E (NCO amount: 15.5 mass %) available from Asahi Kasei Chemicals Corporation), and 40 parts by mass of an isocyanurate of isophorone diisocyanate (Desmodur (registered trademark) Z4470 (NCO amount: 11.9 mass %) available from Bayer company) were mixed. As a solvent, a mixed solvent of methyl ethyl ketone, n-butyl acetate and toluene was added therein to adjust the concentration of the polyisocyanate component to 60 mass %.

7-2. Polyisocyanate Composition No. 2

100 parts by mass of a biuret-modified product of hexamethylene diisocyanate (Duranate 21S-75E (NCO amount: 15.5 mass %) available from Asahi Kasei Chemicals Corporation), and 100 parts by mass of methyl ethyl ketone were mixed.

7-3. Polyisocyanate Composition No. 3

70 parts by mass of an isocyanurate of isophorone diisocyanate (Desmodur Z4470 (NCO amount: 11.9 mass %) available from Bayer company), and 90 parts by mass of butyl acetate were mixed.

8. Paint

The formulation of the paint is shown in Table 4.

TABLE 4

|  |  | Paint No. | | | | | |
|---|---|---|---|---|---|---|---|
|  |  | P1 | P2 | P3 | P4 | P5 | P6 |
| Formulation | Polyol composition No. | No. 1 | No. 1 | No. 1 | No. 1 | No. 2 | No. 2 |
|  | Polyisocyanate composition No. | No. 1 | No. 1 | No. 1 | No. 1 | No. 2 | No. 3 |
|  | Mass ratio (base material/curing agent) | 100/29.0 | 100/24.0 | 100/16.0 | 100/9.2 | 100/10.7 | 100/8.3 |
|  | Molar ratio (NCO/OH) | 1.20/1.00 | 1.00/1.00 | 0.65/1.00 | 0.38/1.00 | 1.20/1.00 | 1.00/1.00 |
| Properties | 10% Elastic modulus (kgf/cm$^2$) | 190 | 150 | 75 | 7.9 | 10 | 40 |

9. Formation of Paint Film

The surface of the golf ball body obtained above was subjected to a sandblast treatment, and a mark was formed thereon. Then, the paint was applied to the golf ball body with a spray gun, and the paint was dried in an oven of 40° C. for 24 hours to obtain the golf ball having a mass of 45.3 g. The golf ball body was placed in a rotating member provided with three prongs, the rotating member was allowed to rotate at 300 rpm, and application of the paint was conducted by spacing a spray distance (7 cm) between the air gun and the golf ball body while moving the air gun in an up and down direction. Application of the paint was conducted under the air gun spraying conditions of a spraying air pressure: 0.15 MPa, a compressed air tank pressure: 0.10 MPa, a painting time for one application: 1 second, an atmosphere temperature: 20° C. to 27° C., and an atmosphere humidity: 65% or less. It is noted that after the inner layer paint sprayed on the golf ball body was completely dried, the spraying of the outer layer paint was conducted. Evaluation results of the obtained golf balls are shown in Tables 5, 6.

TABLE 5

|  |  |  | Golf ball No. | | | | | |
|---|---|---|---|---|---|---|---|---|
|  |  |  | 1 | 2 | 3 | 4 | 5 | 6 |
| Core | Formulation | | No. 1 | No. 1 | No. 1 | No. 1 | No. 1 | No. 1 |
|  | Diameter (mm) | | 39.7 | 39.7 | 39.7 | 39.7 | 39.7 | 39.7 |
|  | Compression deformation amount (mm) | | 3.3 | 3.3 | 3.3 | 3.3 | 3.3 | 3.3 |
| Intermediate layer | Formulation | | M1 | M1 | M1 | M1 | M1 | M1 |
|  | Thickness Tm (mm) | | 1.0 | 1.0 | 1.0 | 1.0 | 1.0 | 1.0 |
|  | Material hardness Hm (Shore D) | | 63 | 63 | 63 | 63 | 63 | 63 |
|  | 10% Elastic modulus M10 (kgf/cm$^2$) | | 170 | 170 | 170 | 170 | 170 | 170 |
| Cover | Formulation | | C1 | C1 | C1 | C1 | C1 | C1 |
|  | Thickness Tc (mm) | | 0.5 | 0.5 | 0.5 | 0.5 | 0.5 | 0.5 |
|  | Material hardness Hc (Shore D) | | 27 | 27 | 27 | 27 | 27 | 27 |
|  | 10% Elastic modulus C10 (kgf/cm$^2$) | | 10 | 10 | 10 | 10 | 10 | 10 |
| Paint film | Inner layer | Formulation | P1 | P1 | P1 | P2 | P2 | P1 |
|  |  | 10% Elastic modulus Pi10 (kgf/cm$^2$) | 190 | 190 | 190 | 150 | 150 | 190 |
|  |  | Thickness Ti (μm) | 10 | 10 | 15 | 10 | 10 | 10 |
|  | Outer layer | Formulation | P4 | P4 | P4 | P5 | P4 | P6 |
|  |  | 10% Elastic modulus Po10 (kgf/cm$^2$) | 7.9 | 7.9 | 7.9 | 10 | 7.9 | 40 |
|  |  | Thickness To (μm) | 3 | 5 | 5 | 5 | 5 | 5 |
| Ball | 10% Elastic modulus difference Pi10 − Po10 (kgf/cm$^2$) | | 182.1 | 182.1 | 182.1 | 140 | 142.1 | 150 |
|  | Thickness difference Ti − To (μm) | | 7 | 5 | 10 | 5 | 5 | 5 |
|  | 10% Elastic modulus difference Pi10 − C10 (kgf/cm$^2$) | | 180 | 180 | 180 | 140 | 140 | 180 |
|  | 10% Elastic modulus difference Po10 − C10 (kgf/cm$^2$) | | −2.1 | −2.1 | −2.1 | 0 | −2.1 | 30 |
|  | 10% Elastic modulus difference M10 − C10 (kgf/cm$^2$) | | 160 | 160 | 160 | 160 | 160 | 160 |
|  | Compression deformation amount (mm) | | 2.8 | 2.8 | 2.8 | 2.8 | 2.8 | 2.8 |
|  | W#1 | Ball initial velocity (m/s) | 73.3 | 73.3 | 73.3 | 73.3 | 73.3 | 73.3 |
|  |  | Spin rate (rpm) | 2650 | 2650 | 2650 | 2650 | 2650 | 2650 |
|  |  | Flight distance (m) | 263.7 | 263.7 | 263.7 | 263.7 | 263.7 | 263.7 |
|  | Approach | Spin rate under rough condition (rpm) | 155 | 165 | 180 | 360 | 190 | 240 |
|  |  | Spin rate under wet condition (rpm) | 40 | 45 | 60 | 15 | 20 | 60 |

|  |  |  | Golf ball No. | | | | |
|---|---|---|---|---|---|---|---|
|  |  |  | 7 | 8 | 9 | 10 | 11 |
| Core | Formulation | | No. 2 + No. 3 | No. 1 | No. 1 | No. 1 | No. 1 |
|  | Diameter (mm) | | 39.7 | 39.7 | 39.7 | 39.7 | 38.5 |
|  | Compression deformation amount (mm) | | 2.9 | 3.3 | 3.3 | 3.3 | 3.3 |
| Intermediate layer | Formulation | | M1 | M2 | M3 | M1 | M2 |
|  | Thickness Tm (mm) | | 1.0 | 1.0 | 1.0 | 1.0 | 1.6 |
|  | Material hardness Hm (Shore D) | | 63 | 68 | 57 | 63 | 68 |
|  | 10% Elastic modulus M10 (kgf/cm$^2$) | | 170 | 230 | 110 | 170 | 230 |

TABLE 5-continued

| | | | | | | | |
|---|---|---|---|---|---|---|---|
| Cover | Formulation | | C1 | C1 | C1 | C3 | C1 |
| | Thickness Tc (mm) | | 0.5 | 0.5 | 0.5 | 0.5 | 0.5 |
| | Material hardness Hc (Shore D) | | 27 | 27 | 27 | 36 | 27 |
| | 10% Elastic modulus C10 (kgf/cm²) | | 10 | 10 | 10 | 18 | 10 |
| Paint film | Inner layer | Formulation | P1 | P1 | P1 | P1 | P1 |
| | | 10% Elastic modulus Pi10 (kgf/cm²) | 190 | 190 | 190 | 190 | 190 |
| | | Thickness Ti (μm) | 10 | 10 | 10 | 10 | 10 |
| | Outer layer | Formulation | P5 | P4 | P4 | P4 | P4 |
| | | 10% Elastic modulus Po10 (kgf/cm²) | 10 | 7.9 | 7.9 | 7.9 | 7.9 |
| | | Thickness To (μm) | 5 | 5 | 5 | 5 | 5 |
| Ball | 10% Elastic modulus difference Pi10 − Po10 (kgf/cm²) | | 180 | 182.1 | 182.1 | 182.1 | 182.1 |
| | Thickness difference Ti − To (μm) | | 5 | 5 | 5 | 5 | 5 |
| | 10% Elastic modulus difference Pi10 − C10 (kgf/cm²) | | 180 | 180 | 180 | 172 | 180 |
| | 10% Elastic modulus difference Po10 − C10 (kgf/cm²) | | 0 | −2.1 | −2.1 | −10.1 | −2.1 |
| | 10% Elastic modulus difference M10 − C10 (kgf/cm²) | | 160 | 220 | 100 | 152 | 220 |
| | Compression deformation amount (mm) | | 2.4 | 2.7 | 2.9 | 2.8 | 2.6 |
| | W#1 | Ball initial velocity (m/s) | 73.5 | 73.3 | 73.2 | 73.4 | 73.5 |
| | | Spin rate (rpm) | 2700 | 2610 | 2680 | 2570 | 2520 |
| | | Flight distance (m) | 264.2 | 264.1 | 263.0 | 265.3 | 266.1 |
| | Approach | Spin rate under rough condition (rpm) | 360 | 140 | 170 | 110 | 100 |
| | | Spin rate under wet condition (rpm) | 20 | 30 | 60 | 0 | 25 |

TABLE 6

| | | | Golf ball No. | | | | | |
|---|---|---|---|---|---|---|---|---|
| | | | 12 | 13 | 14 | 15 | 16 | 17 |
| Core | Formulation | | No. 1 | No. 1 | No. 1 | No. 1 | No. 1 | No. 1 |
| | Diameter (mm) | | 39.7 | 39.7 | 39.7 | 39.7 | 39.7 | 39.7 |
| | Compression deformation amount (mm) | | 3.3 | 3.3 | 3.3 | 3.3 | 3.3 | 3.3 |
| Intermediate layer | Formulation | | M1 | M1 | M1 | M1 | M1 | M1 |
| | Thickness Tm (mm) | | 1.0 | 1.0 | 1.0 | 1.0 | 1.0 | 1.0 |
| | Material hardness Hm (Shore D) | | 63 | 63 | 63 | 63 | 63 | 63 |
| | 10% Elastic modulus M10 (kgf/cm²) | | 170 | 170 | 170 | 170 | 170 | 170 |
| Cover | Formulation | | C1 | C1 | C1 | C1 | C1 | C1 |
| | Thickness Tc (mm) | | 0.5 | 0.5 | 0.5 | 0.5 | 0.5 | 0.5 |
| | Material hardness Hc (Shore D) | | 27 | 27 | 27 | 27 | 27 | 27 |
| | 10% Elastic modulus C10 (kgf/cm²) | | 10 | 10 | 10 | 10 | 10 | 10 |
| Paint film | Inner layer | Formulation | P1 | P1 | P5 | P1 | P2 | P4 |
| | | 10% Elastic modulus Pi10 (kgf/cm²) | 190 | 190 | 10 | 190 | 150 | 7.9 |
| | | Thickness Ti (μm) | 10 | 10 | 15 | 5 | 10 | 10 |
| | Outer layer | Formulation | P3 | P5 | P5 | P4 | P1 | P1 |
| | | 10% Elastic modulus Po10 (kgf/cm²) | 75 | 10 | 10 | 7.9 | 190 | 190 |
| | | Thickness To (μm) | 10 | 10 | 5 | 15 | 5 | 5 |
| Ball | 10% Elastic modulus difference Pi10 − Po10 (kgf/cm²) | | 115 | 180 | 0 | 182.1 | −40 | −182.1 |
| | Thickness difference Ti − To (μm) | | 0 | 0 | 10 | −10 | 5 | 5 |
| | 10% Elastic modulus difference Pi10 − C10 (kgf/cm²) | | 180 | 180 | 0 | 180 | 140 | −2.1 |
| | 10% Elastic modulus difference Po10 − C10 (kgf/cm²) | | 65 | 0 | 0 | −2.1 | 180 | 180 |
| | 10% Elastic modulus difference M10 − C10 (kgf/cm²) | | 160 | 160 | 160 | 160 | 160 | 160 |
| | Compression deformation amount (mm) | | 2.8 | 2.8 | 2.8 | 2.8 | 2.7 | 2.9 |
| | W#1 | Ball initial velocity (m/s) | 73.3 | 73.3 | 73.3 | 73.3 | 73.3 | 73.3 |
| | | Spin rate (rpm) | 2650 | 2650 | 2650 | 2650 | 2650 | 2650 |
| | | Flight distance (m) | 263.7 | 263.7 | 263.7 | 263.7 | 263.7 | 263.7 |
| | Approach | Spin rate under rough condition (rpm) | 0 | 200 | 280 | 210 | −130 | −70 |
| | | Spin rate under wet condition (rpm) | 0 | −210 | −480 | −240 | 45 | 25 |

| | | | Golf ball No. | | | |
|---|---|---|---|---|---|---|
| | | | 18 | 19 | 20 | 21 |
| Core | Formulation | | No. 1 | No. 1 | No. 1 | No. 1 |
| | Diameter (mm) | | 39.7 | 39.7 | 39.7 | 39.7 |
| | Compression deformation amount (mm) | | 3.3 | 3.3 | 3.3 | 3.3 |
| Intermediate layer | Formulation | | M1 | M1 | M3 | M4 |
| | Thickness Tm (mm) | | 1.0 | 1.0 | 1.0 | 1.0 |
| | Material hardness Hm (Shore D) | | 63 | 63 | 57 | 43 |
| | 10% Elastic modulus M10 (kgf/cm²) | | 170 | 170 | 110 | 45 |
| Cover | Formulation | | C1 | C1 | C4 | C4 |
| | Thickness Tc (mm) | | 0.5 | 0.5 | 0.5 | 0.5 |
| | Material hardness Hc (Shore D) | | 27 | 27 | 63 | 63 |
| | 10% Elastic modulus C10 (kgf/cm²) | | 10 | 10 | 170 | 170 |

TABLE 6-continued

| | | | | | | | |
|---|---|---|---|---|---|---|---|
| Paint film | Inner layer | Formulation | | P4 | P6 | P1 | P1 |
| | | 10% Elastic modulus Pi10 (kgf/cm$^2$) | | 7.9 | 40 | 190 | 190 |
| | | Thickness Ti (μm) | | 10 | 10 | 10 | 10 |
| | Outer layer | Formulation | | P4 | P6 | P4 | P4 |
| | | 10% Elastic modulus Po10 (kgf/cm$^2$) | | 7.9 | 40 | 7.9 | 7.9 |
| | | Thickness To (μm) | | 5 | 5 | 5 | 5 |
| Ball | | 10% Elastic modulus difference Pi10 − Po10 (kgf/cm$^2$) | | 0 | 0 | 182.1 | 182.1 |
| | | Thickness difference Ti − To (μm) | | 5 | 5 | 5 | 5 |
| | | 10% Elastic modulus difference Pi10 − C10 (kgf/cm$^2$) | | −2.1 | 30 | 20 | 20 |
| | | 10% Elastic modulus difference Po10 − C10 (kgf/cm$^2$) | | −2.1 | 30 | −162.1 | −162.1 |
| | | 10% Elastic modulus difference M10 − C10 (kgf/cm$^2$) | | 160 | 160 | −60 | −125 |
| | | Compression deformation amount (mm) | | 2.8 | 2.7 | 2.8 | 2.8 |
| | W#1 | Ball initial velocity (m/s) | | 73.5 | 73.3 | 73.3 | 73.3 |
| | | Spin rate (rpm) | | 2650 | 2650 | 2560 | 2660 |
| | | Flight distance (m) | | 263.7 | 263.7 | 264.2 | 263.2 |
| | Approach | Spin rate under rough condition (rpm) | | 220 | 160 | −280 | −250 |
| | | Spin rate under wet condition (rpm) | | −430 | −380 | −360 | −320 |

The golf balls No. 1 to 9 and 11 are the cases that a 10% elastic modulus (Pi10) of an innermost layer of the paint film is greater than a 10% elastic modulus (Po10) of an outermost layer of the paint film and a 10% elastic modulus (C10) of a material constituting the cover, and a thickness (Ti) of the innermost layer of the paint film is greater than a thickness (To) of the outermost layer of the paint film, a 10% elastic modulus (M10) of a material constituting the intermediate layer is greater than the 10% elastic modulus (C10) of the material constituting the cover, and a difference (Po10−C10) between the 10% elastic modulus (Po10) of the outermost layer of the paint film and the 10% elastic modulus (C10) of the material constituting the cover is −4.0 kgf/cm$^2$ or more and 50 kgf/cm$^2$ or less, and a Shore D hardness (Hc) of the material constituting the cover is 40 or less. Each of these golf balls No. 1 to 9 and 11 has excellent approach performance under a rough condition and excellent approach performance under a wet condition while maintaining a flight distance on driver shots.

On the other hand, the golf balls No. 10 and 12 to 21 not satisfying the above requirements fail to strike a good balance in the approach performance under a rough condition and the approach performance under a wet condition.

This application is based on Japanese patent application No. 2017-252822 filed on Dec. 28, 2017, the contents of which are hereby incorporated by reference.

The invention claimed is:

1. A golf ball comprising a golf ball body and a paint film formed on a surface of the golf ball body, wherein the golf ball body has a spherical core, an intermediate layer covering the spherical core, and a cover covering the intermediate layer, and the paint film has a multi-layered construction composed of two or more layers, wherein a 10% elastic modulus (Pi10) of an innermost layer of the paint film is greater than a 10% elastic modulus (Po10) of an outermost layer of the paint film and a 10% elastic modulus (C10) of a material constituting the cover, and a thickness (Ti) of the innermost layer of the paint film is greater than a thickness (To) of the outermost layer of the paint film, a 10% elastic modulus (M10) of a material constituting the intermediate layer is greater than the 10% elastic modulus (C10) of the material constituting the cover, and a difference (Po10−C10) between the 10% elastic modulus (Po10) of the outermost layer of the paint film and the 10% elastic modulus (C10) of the material constituting the cover is −4.0 kgf/cm$^2$ or more and 50 kgf/cm$^2$ or less, and a Shore D hardness (Hc) of the material constituting the cover is 40 or less.

2. The golf ball according to claim 1, wherein the thickness (Ti) of the innermost layer of the paint film is 6 μm or more and 30 μm or less, and the thickness (To) of the outermost layer of the paint film is 1 μm or more and 15 μm or less.

3. The golf ball according to claim 1, wherein the 10% elastic modulus (Pi10) of the innermost layer of the paint film is 100 kgf/cm$^2$ or more, and the 10% elastic modulus (Po10) of the outermost layer of the paint film is less than 100 kgf/cm$^2$.

4. The golf ball according to claim 1, wherein the 10% elastic modulus (M10) of the material constituting the intermediate layer is 100 kgf/cm$^2$ or more, and the 10% elastic modulus (C10) of the material constituting the cover is less than 100 kgf/cm$^2$.

5. The golf ball according to claim 1, wherein the 10% elastic modulus (M10) of the material constituting the intermediate layer is 300 kgf/cm$^2$ or less, and a Shore D hardness (Hm) of the material constituting the intermediate layer is 70 or less.

6. The golf ball according to claim 1, wherein a difference (Pi10−Po10) between the 10% elastic modulus (Pi10) of the innermost layer of the paint film and the 10% elastic modulus (Po10) of the outermost layer of the paint film is 25 kgf/cm$^2$ or more and 400 kgf/cm$^2$ or less.

7. The golf ball according to claim 1, wherein a difference (Pi10−C10) between the 10% elastic modulus (Pi10) of the innermost layer of the paint film and the 10% elastic modulus (C10) of the material constituting the cover is 25 kgf/cm$^2$ or more and 400 kgf/cm$^2$ or less.

8. The golf ball according to claim 1, wherein a difference (Ti−To) between the thickness (Ti) of the innermost layer of the paint film and the thickness (To) of the outermost layer of the paint film is 1 μm or more and 20 μm or less.

9. The golf ball according to claim 1, wherein a difference (M10−C10) between the 10% elastic modulus (M10) of the material constituting the intermediate layer and the 10% elastic modulus (C10) of the material constituting the cover is 50 kgf/cm$^2$ or more and 400 kgf/cm$^2$ or less.

10. The golf ball according to claim 1, wherein a difference (Hm−Hc) between a Shore D hardness (Hm) of the material constituting the intermediate layer and the Shore D hardness (Hc) of the material constituting the cover is 20 or more and 50 or less.

11. The golf ball according to claim 1, wherein the innermost layer of the paint film is formed from a curing type paint composed of a polyisocyanate composition and a polyol composition containing a urethane polyol.

12. The golf ball according to claim 11, wherein the polyisocyanate composition contains a biuret-modified product of hexamethylene diisocyanate, an isocyanurate of hexamethylene diisocyanate and an isocyanurate of isophorone diisocyanate.

13. The golf ball according to claim 11, wherein a polyol component constituting the urethane polyol contained in the polyol composition includes a polyether diol having a number average molecular weight of 600 or more and 3000 or less.

14. The golf ball according to claim 13, wherein the polyol component constituting the urethane polyol further includes trimethylolpropane, and a mixing ratio (trimethylolpropane/polyether diol) of the trimethylolpropane to the polyether diol is 1.0 or more and 4.0 or less in a molar ratio.

15. The golf ball according to claim 1, wherein the outermost layer of the paint film is formed from a curing type paint composed of a polyisocyanate composition and a polyol composition containing a polyrotaxane.

16. The golf ball according to claim 15, wherein the polyisocyanate composition contains a biuret-modified product of hexamethylene diisocyanate or an isocyanurate of isophorone diisocyanate.

17. The golf ball according to claim 15, wherein the polyrotaxane contained in the polyol composition comprises a cyclodextrin, a linear molecule piercing through the cyclic structure of the cyclodextrin, and a blocking group located at both terminals of the linear molecule to prevent disassociation of the cyclodextrin, and at least a part of hydroxyl groups of the cyclodextrin is modified with a caprolactone chain via a —O—$C_3H_6$—O— group.

18. The golf ball according to claim 15, wherein the polyol composition further contains a polycaprolactone polyol, and a mass ratio (polycaprolactone polyol/polyrotaxane) of the polycaprolactone polyol to the polyrotaxane is 10/90 or more and 90/10 or less.

19. The golf ball according to claim 15, wherein the curing type paint further contains a vinyl chloride-vinyl acetate copolymer and/or a modified product thereof, and a modified silicone.

20. The golf ball according to claim 1, wherein the material constituting the intermediate layer contains an ionomer resin and the material constituting the cover contains a polyurethane resin.

* * * * *